(12) United States Patent
Bossen

(10) Patent No.: US 11,284,115 B2
(45) Date of Patent: Mar. 22, 2022

(54) SYSTEMS AND METHODS FOR APPLYING ADAPTIVE LOOP FILTERS IN VIDEO CODING

(71) Applicant: Sharp Kabushiki Kaisha, Sakai (JP)

(72) Inventor: Frank Bossen, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/212,018

(22) Filed: Mar. 25, 2021

(65) Prior Publication Data

US 2021/0306672 A1 Sep. 30, 2021

Related U.S. Application Data

(60) Provisional application No. 63/003,241, filed on Mar. 31, 2020.

(51) Int. Cl.
| | |
|---|---|
| *H04N 19/00* | (2014.01) |
| *H04N 19/80* | (2014.01) |
| *H04N 19/176* | (2014.01) |
| *H04N 19/186* | (2014.01) |
| *H04N 19/117* | (2014.01) |

(52) U.S. Cl.
CPC ........... *H04N 19/80* (2014.11); *H04N 19/117* (2014.11); *H04N 19/176* (2014.11); *H04N 19/186* (2014.11)

(58) Field of Classification Search
CPC .... H04N 19/117; H04N 19/80; H04N 19/186; H04N 19/176
See application file for complete search history.

(56) References Cited

U.S. PATENT DOCUMENTS

| | | | | |
|---|---|---|---|---|
| 2021/0152841 A1* | 5/2021 | Hu | ........................ | H04N 19/105 |
| 2021/0235078 A1* | 7/2021 | Hu | ........................ | H04N 19/132 |
| 2021/0274186 A1* | 9/2021 | Andersson | ........... | H04N 19/176 |
| 2021/0306673 A1* | 9/2021 | Sarwer | ................ | H04N 19/186 |

OTHER PUBLICATIONS

Segall et al., "Joint Call for Proposals on Video Compression with Capability beyond HEVC", Joint Video Exploration Team (JVET) of ITU-T-SG 16 WP 3 and ISO/IEC JTC 1/SC 29/WG 11, JVET-H1002 (v6), Oct. 18-24, 2017, 27 pages.
Bross, "Versatile Video Coding (Draft 1)", Joint Video Experts Team (JVET) of ITU-T SG 16 WP 3 and ISO/IEC JTC 1/SC 29/WG 11, JVET-J1001-v2, Apr. 10-20, 2018, 40 pages.
Bross et al., "Versatile Video Coding (Draft 8)", Joint Video Experts Team (JVET) of ITU-T SG 16 WP 3 and ISO/IEC JTC 1/SC 29/WG 11, JVET-Q2001-vE, Jan. 7-17, 2020, 508 pages.
Chen et al., "Algorithm Description of Joint Exploration Test Model 7 (JEM 7)", Joint Video Exploration Team (JVEI) of ITU-T-SG 16 WP 3 and ISO/IEC JTC 1/SC 29/WG 11, JVET-G1001-V1, Jul. 13-21, 2017, 51 pages.
International Telecommunication Union, "Series: Audiovisual and Multimedia Systems Infrastructure of audiovisual services—Coding of moving video, High efficiency video coding", Recommendation ITU-T H. 265, Dec. 2016, 662 pages.
International Telecommunication Union, "Series: Audiovisual and Multimedia Systems Infrastructure of audiovisual services—Coding of moving video, Advanced video coding for generic audiovisual services", Recommendation ITU-T H. 264, Apr. 2017, 810 pages.

* cited by examiner

*Primary Examiner* — Zhihan Zhou
(74) *Attorney, Agent, or Firm* — Keating & Bennett, LLP

(57) ABSTRACT

A device may be configured to apply adaptive loop filters according to one or more of the techniques described herein.

4 Claims, 6 Drawing Sheets

SYSTEMS AND METHODS FOR APPLYING ADAPTIVE LOOP FILTERS IN VIDEO CODING

TECHNICAL FIELD

This disclosure relates to video coding and more particularly to techniques for applying adaptive loop filters for coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of ITU-T H.265. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10$^{th}$Meeting of ISO/IEC JTC1/SC29/WG11 16-20 Apr. 2018, San Diego, Calif. From the multiple descriptions of video coding tools, a resulting initial draft text of a video coding specification is described in "Versatile Video Coding (Draft 1)," 10$^{th}$ Meeting of ISO/IEC JTC1/SC29/WG11 16-20 Apr. 2018, San Diego, Calif., document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 8)," 17th Meeting of ISO/IEC JTC1/SC29/WG11 7-17 Jan. 2020, Brussel, BE, document JVET-Q2001-vE, which is incorporated by reference herein, and referred to as JVET-Q2001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices and motion information). Residual data and syntax elements may be entropy coded. Entropy encoded residual data and syntax elements may be included in data structures forming a compliant bitstream.

SUMMARY OF INVENTION

A method of modifying a reconstructed sample value, the method comprising:
  determining a current reconstructed sample value curr;
  determining a variable alfShiftY for a shift operation according to a vertical position;
  determining a sum value S;
  determining a modified sum value being equivalent to a value of MS in the following equation, $$MS=curr+((S+(1<<alfShiftY>>1))>>alfShiftY); \text{ and}$$

calculating a modified reconstructed sample value by using the modified sum value.

A device comprising one or more processors configured to:
  determine a current reconstructed sample value curr;
  determine a variable alfShiftY for a shift operation according to a vertical position;
  determine a sum value S;
  determine a modified sum value being equivalent to a value of MS in the following equation, $$MS=curr+((S+(1<<alfShiftY>>1))>>alfShiftY); \text{ and}$$

calculate a modified reconstructed sample value by using the modified sum value.

DESCRIPTION OF EMBODIMENTS

Figure 1:
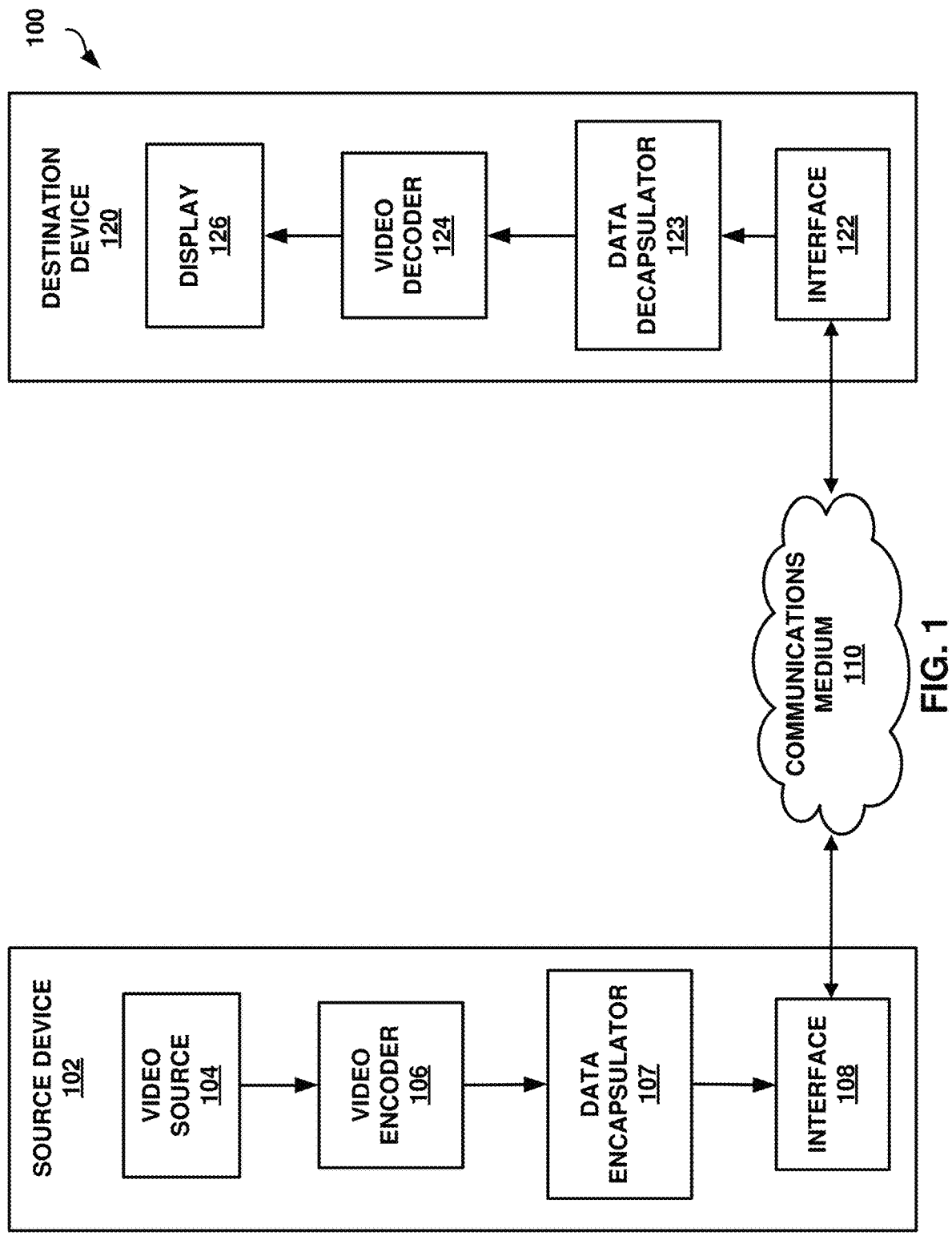
FIG. 1 is a block diagram illustrating an example of a system that may be configured to encode and decode video data according to one or more techniques of this disclosure.

In general, this disclosure describes various techniques for coding video data. In particular, this disclosure describes techniques for applying adaptive loop filters. It should be noted that although techniques of this disclosure are described with respect to ITU-T H.264, ITU-T H.265, JEM, and JVET-Q2001, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-Q2001. Thus, reference to ITU-T H.264, ITU-T H.265, JEM, and/or JVET-Q2001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device comprises one or more processors configured to determine a current reconstructed sample value, determine a sum value, wherein the sum value is determined as a sum of a first value determined according a filter and a second value determined according to a vertical sample position, and calculate a modified reconstructed sample value as the sum of the first value and the second value.

In one example, a non-transitory computer-readable storage medium comprises instructions stored thereon that, when executed, cause one or more processors of a device to determine a current reconstructed sample value, determine a sum value, wherein the sum value is determined as a sum of a first value determined according a filter and a second value determined according to a vertical sample position, and calculate a modified reconstructed sample value as the sum of the first value and the second value.

In one example, an apparatus comprises means for determining a current reconstructed sample value means for determining a sum value, wherein the sum value is determined as a sum of a first value determined according a filter and a second value determined according to a vertical sample position, and means for calculating a modified reconstructed sample value as the sum of the first value and the second value.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit structure having its root at the CU. In ITU-T H.265, prediction unit structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may by halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-Q2001, CTUs are partitioned according a quadtree plus multi-type tree (QTMT or QT+MTT) structure. The QTMT in JVET-Q2001 is similar to the QTBT in JEM. However, in JVET-Q2001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

As described above, each video frame or picture may be divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to JVET-Q2001, slices are required to consist of an integer number of complete tiles or an integer number of consecutive complete CTU rows within a tile, instead of only being required to consist of an integer number of CTUs, a provided in ITU-T H.265. It should be noted that in JVET-Q2001, the slice design does not include slice segments (i.e., no independent/dependent slice segments). Thus, in JVET-Q2001, a picture may include a single tile, where the single tile is contained within a single slice or a picture may include multiple tiles where the multiple tiles (or CTU rows thereof) may be contained within one or more slices. In JVET-Q2001, the partitioning of a picture into tiles is specified by specifying respective heights for tile rows and respective widths for tile columns. Thus, in JVET-Q2001 a tile is a rectangular region of CTUs within a particular tile row and a particular tile column position. Further, JVET-Q2001 supports two modes of slices: raster-scan slices and rectangular slices. For raster-scan slices, a slice contains a sequence of complete tiles in a tile raster scan of a picture, where a tile raster scan of a picture is a mapping of the rectangular two-dimensional pattern of tiles within the picture to a one-dimensional pattern where the first top row of the two-dimensional pattern scanned from left to right, followed similarly by the second, third, etc., rows of the pattern (going down) each scanned from left to right. For rectangular slices, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice. As described in further detail below, a picture parameter set (PPS) associated with a picture indicates whether a slices in the picture are raster-scan slices or rectangular slices.

Figure 2:
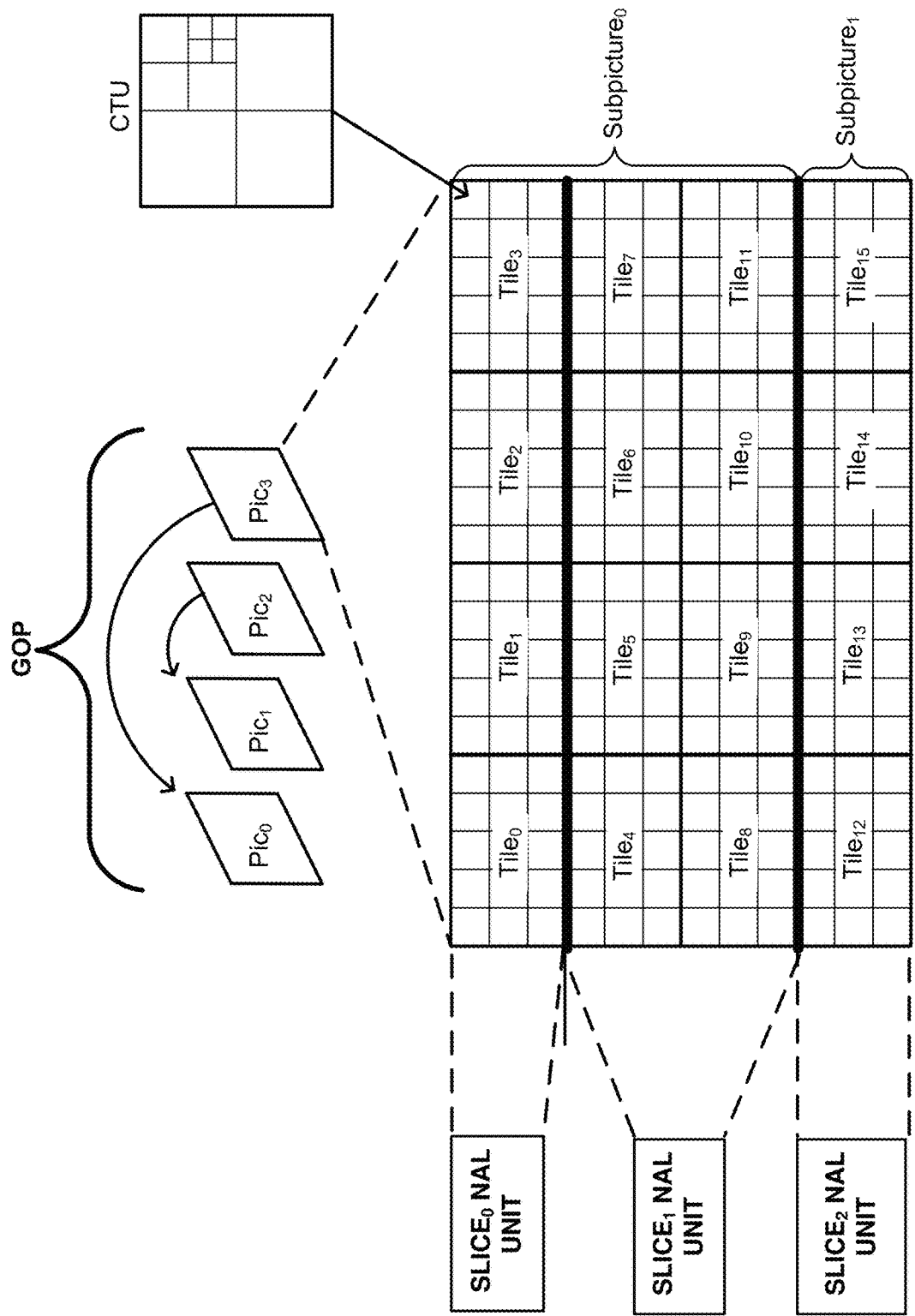
FIG. 2 is a conceptual diagram illustrating coded video data and corresponding data structures according to one or more techniques of this disclosure.

Further, it should be noted that JVET-Q2001 provides where a picture may be partitioned into subpictures, where a subpicture is a rectangular region of a CTUs within a picture. The top-left CTU of a subpicture may be located at any CTU position within a picture with subpictures being constrained to include one or more slices. Thus, unlike a tile, a subpicture is not necessarily limited to a particular row and column position. It should be noted that subpictures may be useful for encapsulating regions of interest within a picture and a sub-bitstream extraction process may be used to only decode and display a particular region of interest. That is, as described in further detail below, a bitstream of coded video data includes a sequence of network abstraction layer (NAL) units, where a NAL unit encapsulates coded video data, (i.e., video data corresponding to a slice of picture) or a NAL unit encapsulates metadata used for decoding video data (e.g., a parameter set) and a sub-bitstream extraction process forms a new bitstream by removing one or more NAL units from a bitstream. FIG. 2 is a conceptual diagram illustrating an example of a picture within a group of pictures partitioned according to tiles, slices, and subpictures. It should be noted that the techniques described herein may be applicable to tiles, slices, subpictures, sub-divisions thereof and/or equivalent structures thereto. That is, the techniques described herein may be generally applicable regardless of how a picture is partitioned into regions. For example, in some cases, the techniques described herein may be applicable in cases where a tile may be partitioned into so-called bricks, where a brick is a rectangular region of CTU rows within a particular tile. Further, for example, in some cases, the techniques described herein may be applicable in cases where one or more tiles may be included in so-called tile groups, where a tile group includes an integer number of adjacent tiles. In one example, a tile group may be called a slice. In the example illustrated in FIG. 2, $Pic_3$ is illustrated as including 16 tiles (i.e., $Tile_0$ to $Tile_{15}$) and three slices (i.e., $Slice_0$ to $Slice_2$). In the example illustrated in FIG. 2, $Slice_0$ includes four tiles (i.e., $Tile_0$ to $Tile_3$), $Slice_1$ includes eight tiles (i.e., $Tile_4$ to $Tile_{11}$), and $Slice_2$ includes four tiles (i.e., $Tile_{12}$ to $Tile_{15}$). It should be noted that FIG. 2 illustrates an example of a raster scan slices. Referring to FIG. 2, an example rectangular slices would be if $Slice_0$ included tiles $Tile_0$, $Tile_4$, $Tile_8$, and $Tile_{12}$; $Slice_1$ included tiles $Tile_1$, $Tile_2$, $Tile_5$, $Tile_6$, $Tile_9$ $Tile_{10}$, $Tile_{13}$ and $Tile_{14}$; and $Slice_2$ included tiles $Tile_3$, $Tile_7$, $Tile_{11}$, and $Tile_{15}$. Further, as illustrated in the example of FIG. 2, $Pic_3$ is illustrated as including two subpictures (i.e., $Subpicture_0$ and $Subpicture_1$), where $Subpicture_0$ includes $Slice_0$ and $Slice_1$ and where $Subpicture_1$ includes $Slice_2$. As described above, subpictures may be useful for encapsulating regions of interest within a picture and a sub-bitstream extraction process may be used in order to selectively decode (and display) a region interest. For example, referring to FIG. 2, $Subpicture_0$ may corresponding to an action portion of a sporting event presentation (e.g., a view of the field) and $Subpicture_1$ may corresponding to a scrolling banner displayed during the sporting event presentation. By using organizing a picture into subpictures in this manner, a viewer may be able to disable the display of the scrolling banner. That is, through a sub-bitstream extraction process $Slice_2$ NAL unit may be removed from a bitstream (and thus not decoded) and $Slice_0$ NAL unit and $Slice_1$ NAL unit may be decoded and displayed. The encapsulation of slices of a picture into respective NAL unit data structures and sub-bitstream extraction are described in further detail below. For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, $Pic_2$ is illustrated as referencing $Pic_1$. Similarly, $Pic_3$ is illustrated as referencing $Pic_0$. With respect to FIG. 2, assuming the picture number corresponds to the decoding order, the DPB would be populated as follows: after decoding $Pic_0$, the DPB would include $\{Pic_0\}$; at the onset of decoding $Pic_1$, the DPB would include $\{Pic_0\}$; after decoding $Pic_1$, the DPB would include $\{Pic_0, Pic_1\}$; at the onset of decoding $Pic_2$, the DPB would include $\{Pic_0, Pic_1\}$. $Pic_2$ would then be decoded with reference to $Pic_1$ and after decoding $Pic_2$, the DPB would include $\{Pic_0, Pic_1, Pic_2\}$. At the onset of decoding $Pic_3$, pictures $Pic_0$ and $Pic_1$ would be marked for removal from the DPB, as they are not needed for decoding $Pic_3$ (or any subsequent pictures, not shown)

and assuming $Pic_1$ and $Pic_2$ have been output, the DPB would be updated to include {$Pic_0$}. $Pic_3$ would then be decoded by referencing $Pic_0$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-Q2001, a CU is associated with a transform tree structure having its root at the CU level. The transform tree is partitioned into one or more transform units (TUs). That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

[Object 1]

With respect to the equations used herein, the following arithmetic operators may be used:

+ Addition

− Subtraction

* Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division m mathematical equations where no truncation or rounding is intended.

[Object 2]
Further, the following mathematical functions may be used:
Log2(x) the base-2 logarithm of x;

$$\text{Min}(x, y) = \begin{cases} x; & x <= y \\ y; & x > y \end{cases};$$

$$\text{Max}(x, y) = \begin{cases} x; & x >= y \\ y; & x < y \end{cases}$$

Ceil(x) the smallest integer greater than or equal to x.

$$\text{Clip3}(x, y, z) = \begin{cases} x; & z < y \\ y; & z > y \\ z; & \text{otherwise} \end{cases}$$

[Object 3]
With respect to the example syntax used herein, the following definitions of logical operators may be applied:
x && y Boolean logical "and" of x and y
x||y Boolean logical "or" of x and y
! Boolean logical "not"
x? y: z If x is TRUE, evaluates to the value of y; otherwise, evaluates to the value of z.
[Object 4]
Further, the following relational operators may be applied:
\> Greater than
\>= Greater than or equal to
< Less than
<= Less than or equal to
== Equal to
!= Not equal to
[Object 5]
Further, it should be noted that in the syntax descriptors used herein, the following descriptors may be applied:
 ae(v): context-adaptive arithmetic entropy-coded syntax element.
 b(8): byte having any pattern of bit string (8 bits). The parsing process for this descriptor is specified by the return value of the function read_bits(8).
 (f)n): fixed-pattern bit string using a bits written (from left to right) with the left bit first. The parsing process for this descriptor is specified by the return value of the function read_bits(n).
 i(n): signed integer using n bits. When n is "v" in the syntax table, the number of bits varies in a manner dependent on the value of other syntax elements. The parsing process for this descriptor is specified by the return value of the function read_bits(n) interpreted as a two's complement integer representation with most significant bit written first.
 se(v): signed integer 0-th order Exp-Golomb-coded syntax element with the left bit first.
 u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.
 ue(v): unsigned integer 0-th order Exp-Golomb-coded syntax element with the left bit first.

As described above, video content includes video sequences comprised of a series of pictures and each picture may be divided into one or more regions. In JVET-Q2001, a coded representation of a picture comprises VCL NAL units of a particular layer within an AU and contains all CTUs of the picture. For example, referring again to FIG. 2, the coded representation of $Pic_3$ is encapsulated in three coded slice NAL units (i.e., $Slice_0$ NAL unit, $Slice_1$ NAL unit, and $Slice_2$ NAL unit). It should be noted that the term video coding layer (VCL) NAL unit is used as a collective term for coded slice NAL units, i.e., VCL NAL is a collective term which includes all types of slice NAL units. As described above, and in further detail below, a NAL unit may encapsulate metadata used for decoding video data. A NAL unit encapsulating metadata used for decoding a video sequence is generally referred to as a non-VCL NAL unit. Thus, in JVET-Q2001, a NAL unit may be a VCL NAL unit or a non-VCL NAL unit. It should be noted that a VCL NAL unit includes slice header data, which provides information used for decoding the particular slice. Thus, in JVET-Q2001, information used for decoding video data, which may be referred to as metadata in some cases, is not limited to being included in non-VCL NAL units. JVET-Q2001 provides where a picture unit (PU) is a set of NAL units that are associated with each other according to a specified classification rule, are consecutive in decoding order, and contain exactly one coded picture and where an access unit (AU) is a set of PUs that belong to different layers and contain coded pictures associated with the same time for output from the DPB. JVET-Q2001 further provides where a layer is a set of VCL NAL units that all have a particular value of a layer identifier and the associated non-VCL NAL units. Further, in JVET-Q2001, a PU consists of zero or one PH NAL units, one coded picture, which comprises of one or more VCL NAL units, and zero or more other non-VCL NAL units. Further, in JVET-Q2001, a coded video sequence (CVS) is a sequence of AUs that consists, in decoding order, of a CVSS AU, followed by zero or more AUs that are not CVSS AUs, including all subsequent AUs up to but not including any subsequent AU that is a CVSS AU, where a coded video sequence start (CVSS) AU is an AU in which there is a PU for each layer in the CVS and the coded picture in each present picture unit is a coded layer video sequence start (CLVSS) picture. In JVET-Q2001, a coded layer video sequence (CLVS) is a sequence of PUs within the same layer that consists, in decoding order, of a CLVSS PU, followed by zero or more PUs that are not CLVSS PUs, including all subsequent PUs up to but not including any subsequent PU that is a CLVSS PU. This is, in JVET-Q2001, a bitstream may be described as including a sequence of AUs forming one or more CVSs.

Multi-layer video coding enables a video presentation to be decoded/displayed as a presentation corresponding to a base layer of video data and decoded/displayed one or more additional presentations corresponding to enhancement layers of video data. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. It should be noted that layers may also be coded independent of each other. In this case, there may not be inter-layer prediction between two layers. Each NAL unit may include an identifier indicating a layer of video data the NAL unit is associated with. As described above, a sub-bitstream extraction process may be used to only decode and display a particular region of interest of a picture. Further, a sub-bitstream extraction process may be used to only decode and display a particular layer of video. Sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation).

In JVET-Q2001, each of a video sequence, a GOP, a picture, a slice, and CTU may be associated with metadata that describes video coding properties and some types of metadata an encapsulated in non-VCL NAL units. JVET-Q2001 defines parameters sets that may be used to describe video data and/or video coding properties. In particular, JVET-Q2001 includes the following four types of parameter sets: video parameter set (VPS), sequence parameter set (SPS), picture parameter set (PPS), and adaption parameter set (APS), where a SPS applies to apply to zero or more entire CVSs, a PPS applies to zero or more entire coded pictures, a APS applies to zero or more slices, and a VPS may be optionally referenced by a SPS. A PPS applies to an individual coded picture that refers to it. In JVET-Q2001, parameter sets may be encapsulated as a non-VCL NAL unit and/or may be signaled as a message. JVET-Q2001 also includes a picture header (PH) which is encapsulated as a non-VCL NAL unit. In JVET-Q2001, a picture header applies to all slices of a coded picture. JVET-Q2001 further enables decoding capability information (DCI) and supplemental enhancement information (SEI) messages to be signaled. In JVET-Q2001, DCI and SEI messages assist in processes related to decoding, display or other purposes, however, DCI and SEI messages may not be required for constructing the luma or chroma samples according to a decoding process. In JVET-Q2001, DCI and SEI messages may be signaled in a bitstream using non-VCL NAL units. Further, DCI and SEI messages may be conveyed by some mechanism other than by being present in the bitstream (i.e., signaled out-of-band).

Figure 3:
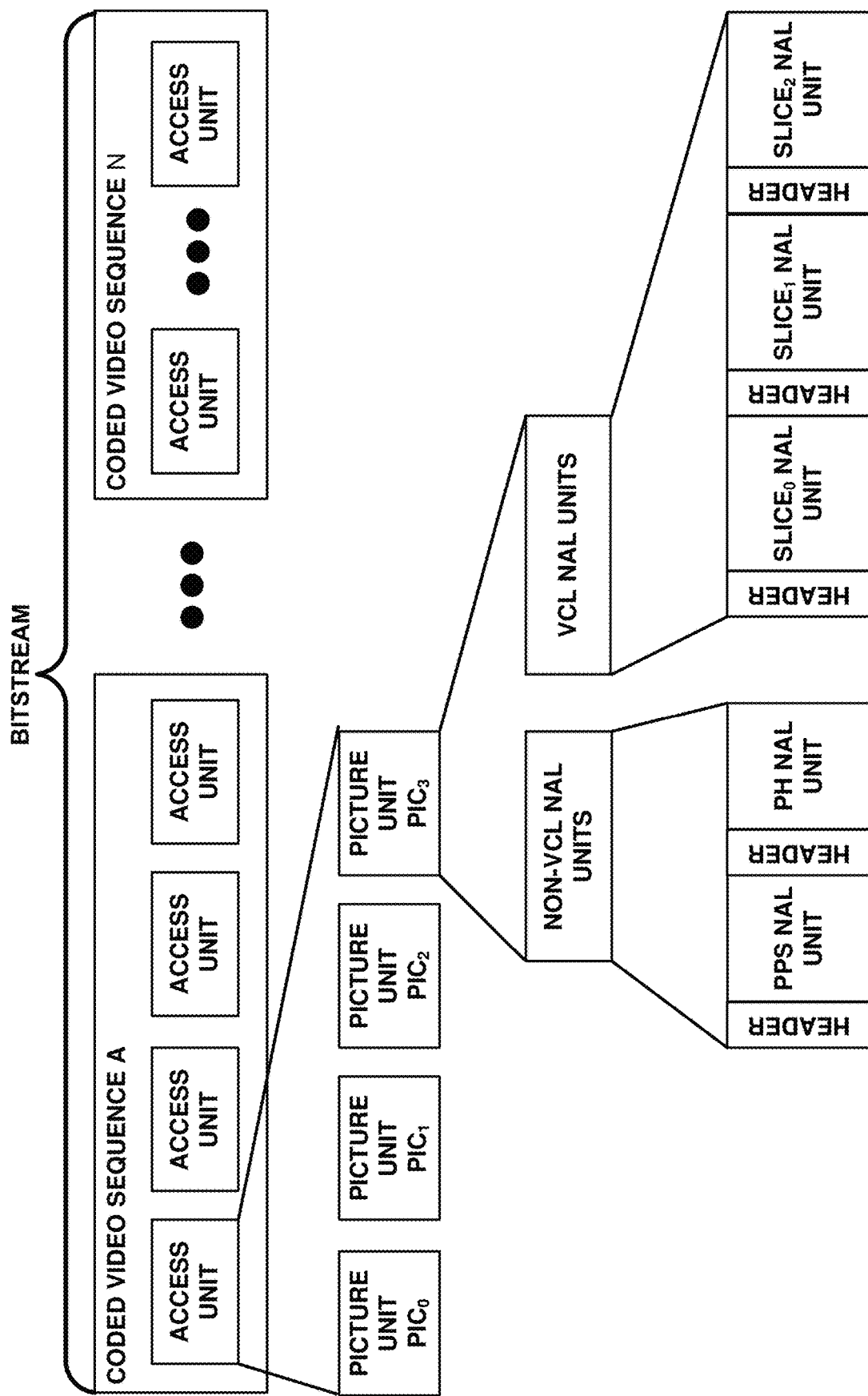
FIG. 3 is a conceptual diagram illustrating a data structure encapsulating coded video data and corresponding metadata according to one or more techniques of this disclosure.

FIG. 3 illustrates an example of a bitstream including multiple CVSs, where a CVS includes AUs, and AUs include picture units. The example illustrated in FIG. 3 corresponds to an example of encapsulating the slice NAL units illustrated in the example of FIG. 2 in a bitstream. In the example illustrated in FIG. 3, the corresponding picture unit for $Pic_3$ includes the three VCL NAL coded slice NAL units, i.e., $Slice_0$ NAL unit, $Slice_1$ NAL unit, and $Slice_2$ NAL unit and two non-VCL NAL units, i.e., a PPS NAL Unit and a PH NAL unit. It should be noted that in FIG. 3, HEADER is a NAL unit header (i.e., not to be confused with a slice header). Further, it should be noted that in FIG. 3, other non-VCL NAL units, which are not illustrated may be included in the CVSs, e.g., SPS NAL units, VPS NAL units, SEI message NAL units, etc. Further, it should be noted that in other examples, a PPS NAL Unit used for decoding $Pic_3$ may be included elsewhere in the bitstream, e.g., in the picture unit corresponding to $Pic_0$ or may be provided by an external mechanism. As described in further detail below, in JVET-Q2001, a PH syntax structure may be present in the slice header of a VCL NAL unit or in a PH NAL unit of the current PU.

[Object 6]

As described above, a video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. As described above, a CU is typically defined according to the number of horizontal and vertical luma samples. Thus, a 16×16 CU formatted according to the 4:2:0 sample format includes 16×16 samples of luma components and 8×8 samples for each chroma component. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component. Table 1 illustrates how a chroma format is specified in JVET-Q2001 based on values of syntax elements chroma_format_idc and separate_colour_plane_flag included in JVET-Q2001. Further, Table 1 illustrates how the variables SubWidthC and SubHeightC are derived depending on the chroma format. SubWidthC and SubHeightC are utilized for filter, as described in further detail below. With respect to Table 1, JVET-Q2001 provides the following:

[Object 7]

In monochrome sampling there is only one sample array, which is nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling, depending on the value of separate_colour_plane_flag, the following applies:

If separate_colour_plane_flag is equal to 0, each of the two chroma arrays has the same height and width as the luma array.

Otherwise (separate_colour_plane_flag is equal to 1), the three colour planes are separately processed as monochrome sampled pictures.

TABLE 1

| chroma_format_idc | separate_colour_plane_flag | Chroma ormat | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

As further described above, the sample values of a reconstructed block may differ from the sample values of the current video block that is encoded. Further, it should be noted that in some cases, coding video data on a block-by-block basis may result in artifacts (e.g., so-called blocking artifacts, banding artifacts, etc.) For example, blocking artifacts may cause coding block boundaries of reconstructed video data to be visually perceptible to a user. In this manner, reconstructed sample values may be modified to minimize the difference between the sample values of the current video block that is encoded and the reconstructed block and/or minimize artifacts introduced by the video coding process. Such modifications may generally be referred to as filtering. It should be noted that filtering may occur as part of an in-loop filtering process or a post-loop filtering process. For an in-loop filtering process, the resulting sample values of a filtering process may be used for predictive video blocks (e.g., stored to a reference frame buffer for subsequent encoding at video encoder and subsequent decoding at a video decoder). For a post-loop filtering process the resulting sample values of a filtering process are merely output as part of the decoding process (e.g., not used for subsequent coding). For example, in the case of a video decoder, for an in-loop filtering process, the sample values resulting from filtering the reconstructed block would be used for subsequent decoding (e.g., stored to a reference buffer) and would be output (e.g., to a display). For a post-loop filtering process, the reconstructed block would be used for subsequent decoding and the sample values resulting from filtering the reconstructed block would be output.

Deblocking (or de-blocking), deblock filtering, or applying a deblocking filter refers to the process of smoothing the boundaries of neighboring reconstructed video blocks (i.e., making boundaries less perceptible to a viewer). Smoothing the boundaries of neighboring reconstructed video blocks may include modifying sample values included in rows or columns adjacent to a boundary. ITU-T H.265 provides where a deblocking filter is applied to reconstructed sample values as part of an in-loop filtering process. ITU-T H.265 includes two types deblocking filters that may be used for modifying luma samples: a Strong Filter which modifies sample values in the three adjacent rows or columns to a boundary and a Weak Filter which modifies sample values in the immediately adjacent row or column to a boundary and conditionally modifies sample values in the second row or column from the boundary. Further, ITU-T H.265 includes one type of filter that may be used for modifying chroma samples: Normal Filter.

In addition to applying a deblocking filter as part of an in-loop filtering process, ITU-T H.265 provides where Sample Adaptive Offset (SAO) filtering may be applied in the in-loop filtering process. In ITU-T H.265, SAO is a process that modifies the deblocked sample values in a region by conditionally adding an offset value. ITU-T H.265 provides two types of SAO filters that may be applied to a CTB: band offset or edge offset. For each of band offset and edge offset, four offset values are included in a bitstream. For band offset, the offset which is applied depends on the amplitude of a sample value (e.g., amplitudes are mapped to bands which are mapped to the four signaled offsets). For edge offset, the offset which is applied depends on a CTB having one of a horizontal, vertical, first diagonal, or second diagonal edge classification (e.g., classifications are mapped to the four signaled offsets).

[Object 8]

Another type of filtering process includes the so-called adaptive loop filter (ALF). An ALF with block-based adaptation is specified in JEM. In JEM, the ALF is applied after the SAO filter. It should be noted that an ALF may be applied to reconstructed samples independently of other filtering techniques. The process for applying the ALF specified in JEM at a video encoder may be summarized as follows: (1) each 2×2 block of the luma component for a reconstructed picture is classified according to a classification index; (2) sets of filter coefficients are derived for each classification index; (3) filtering decisions are determined for the luma component; (4) a filtering decision is determined for the chroma components; and (5) filter parameters (e.g., coefficients and decisions) are signaled. JVET-Q2001 specifies deblocking, SAO, and ALF filters which can be described as being generally based on the deblocking, SAO, and ALF filters provided in ITU-T H.265 and JEM. JVET-Q2001 further includes a so-called cross component ALF (CC-ALF) filter. JVET-Q2001 specifies an adaptive loop filter process as follows:

Inputs of this process are the reconstructed picture sample array prior to adaptive loop filter $recPicture_L$, and, when ChromaArrayType is not equal to 0, the arrays $recPicture_{Cb}$ and $recPicture_{Cr}$.

Outputs of this process are the modified reconstructed picture sample array after adaptive loop filter $alfPicture_L$ and, when ChromaArrayType is not equal to 0, the arrays $ccAlfPicture_{Cb}$ and $ccAlfPicture_{Cr}$.

The sample values in the modified reconstructed picture sample array after adaptive loop filter $alfPicture_L$ and, when ChromaArrayType is not equal to 0, the arrays $alfPicture_{Cb}$ and $alfPicture_{Cr}$ are initially set equal to the sample values in the reconstructed picture sample array prior to adaptive loop filter $recPicture_L$ and, when ChromaArrayType is not equal to 0, the arrays $recPicture_{Cb}$ and $recPicture_{Cr}$, respectively.

[Object 9]

The following ordered steps apply:

For every coding tree unit with luma coding tree block location (rx, ry), where rx=0 . . . PicWidthInCtbsY−1 and ry=0 . . . PicHeightInCtbsY−1, the following applies:

When alf_ctb_flag[0][rx][ry] is equal to 1, the coding tree block filtering process for luma samples as specified below is invoked with $recPicture_L$, $alfPicture_L$, and the luma coding tree block location (xCtb, yCtb) set equal to (rx<<CtbLog2SizeY, ry<<CtbLog2SizeY) as inputs, and the output is the modified filtered picture $alfPicture_L$.

When ChromaArrayType is not equal to 0 and alf_ctb_flag[1][rx][ry] is equal to 1, the coding tree block filtering process for chroma samples as specified below is invoked with recPicture set equal to $recPicture_{Cb}$, alfPicture set equal to $alfPicture_{Cb}$, the chroma coding tree block location (xCtbC, yCtbC) set equal to ((rx<<CtbLog2SizeY)/SubWidthC, (ry<<CtbLog2SizeY)/SubHeightC), and the alternative chroma filter index altIdx set equal to alf_ctb_filter_alt_idx[0][rx][ry] as inputs, and the output, is the modified filtered picture $alfPicture_{Cb}$.

When ChromaArrayType is not equal to 0 and alf_ctb_flag[2][rx][ry] is equal to 1, the coding tree block filtering process for chroma samples as specified below is invoked with recPicture set equal to $recPicture_{Cr}$, alfPicture set equal to $alfPicture_{Cr}$, the chroma coding tree block location (xCtbC, yCtbC) set equal to ((rx<<CtbLog2SizeY)/SubWidthC, (ry<<CtbLog2SizeY)/SubHeightC), and the alternative chroma filter index altIdx set equal to alf_ctb_filter_alt_idx[1][rx][ry] as inputs, and the output is the modified filtered picture $alfPicture_{Cr}$.

When ChromaArrayType is not equal to 0, the sample values in the arrays $ccAlfPicture_{Cb}$ and $ccAlfPicture_{Cr}$ are set equal to the sample values in the arrays $alfPicture_{Cb}$ and $alfPicture_{Cr}$, respectively.

[Object 10]
For every coding tree unit with luma coding tree block location (rx, ry), where rx=0 . . . PicWidthInCtbsY−1 and ry=0 . . . PicHeightInCtbsY−1, the following applies:
When ChromaArrayType is not equal to 0 and alf_ctb_cc_cb_idc[rx][ry] is not equal to 0, the cross-component filtering process as specified below is invoked with recPicture$_L$ set equal to recPicture$_L$, alfPicture$_C$ set equal to alfPicture$_{Cb}$, the chroma coding tree block location (xCtbC, yCtbC) set equal to ((rx<<CtbLog2SizeY)/SubWidthC, (ry<<CtbLog2SizeY)/SubHeightC)), the luma coding tree block location (xCtb, yCtb) set equal to (rx<<CtbLog2SizeY, ry<<CtbLog2SizeY), ccAlfWidth set equal to (1<<CtbLog2SizeY)/SubWidthC, ccAlfHeight set equal to (1<<CtbLog2SizeY)/SubHeightC, and the cross-component filter coefficients CcAlfCoeff[j] set equal to CcAlfApsCoeff$_{Cb}$ [slice_cc_alf_cb_aps_id][alf_ctb_cc_cb_idc[rx][ry]−1][j], with j=0 . . . 6, as inputs, and the output is the modified filtered picture ccAlfPicture$_{Cb}$.
When ChromaArrayType is not equal to 0 and alf_ctb_cc_cr_idc[rx][ry] is not equal to 0, the cross-component filtering process as specified below is invoked with recPicture$_L$ set equal to recPicture$_L$, alfPicture$_C$ set equal to alfPicture$_{Cr}$, the chroma coding tree block location (xCtbC, yCtbC) set equal to ((rx<<CtbLog2SizeY)/SubWidthC, (ry<<CtbLog2SizeY)/SubHeightC)), ccAlfWidth set equal to (1<<CtbLog2SizeY)/SubWidthC, ccAlfHeight set equal to (1<<CtbLog2SizeY)/SubHeightC, and the cross-component filter coefficients CcAlfCoeff[j] set equal to CcAlfApsCoeff$_{Cr}$ [slice_cc_alf_cr_aps_id][alf_ctb_cc_cr_idc[rx][ry]−1][j], with j=0 . . . 6, as inputs, and the output is the modified filtered picture ccAlfPicture$_{Cr}$.

[Object 11]
Coding Tree Block Filtering Process for Luma Samples
Inputs of this process are:
a reconstructed luma picture sample array recPicture prior to the adaptive loop filtering process,
a filtered reconstructed luma picture sample array alfPicture$_L$.
a luma location (xCtb, yCtb) specifying the top-left sample of the current luma coding tree block relative to the top left sample of the current picture.
Output of this process is the modified filtered reconstructed luma picture sample array alfPicture$_L$.
The derivation process for filter index specified below is invoked with the location (xCtb, yCtb) and the reconstructed luma picture sample array recPicture as inputs, and filtIdx[x][y] and transposeIdx[x][y] with x, y=0 . . . CtbSizeY−1 as outputs.
For the derivation of the filtered reconstructed luma samples alfPicture$_L$[x][y], each reconstructed luma sample inside the current luma coding tree block recPicture[x][y] is filtered as follows with x, y=0 . . . CtbSizeY−1
The array of luma filter coefficients f[j] and the array of luma clipping values c[j] corresponding to the filter specified by filtIdx[x][y] is derived as follows with j=0 . . . 11:
If AlfCtbFiltSetIdxY[xCtb>>CtbLog2SizeY] [yCtb>>CtbLog2SizeYϕ is less than 16, the following applies:

i=AlfCtbFiltSetIdxY(xCtb>>CtbLog2SizeY) [yCtb>>CtbLog2SizeY]
f[j]=AlfFixFiltCoeff[AlfClassToFillMap[i][filtIdx[x][y]]][j]
c[j]=2$^{BitDepth}$

[Object 12]
Otherwise
(AlfCtbFiltSetIdxY[xCtb>>Ctblog2SizeY] [yCtb>>CtbLog2SizeY] is greater than or equal to 16, the following applies:
i=slice_alf_aps_id_luma[AlfCtbFiltSetIdxY [xCtb>>CtbLog2SizeY][yCtb>>CtbLog 2SizeY]−16]
f[j]=AlfCoeff$_L$[i][filtIdx[x][y]][j]
c[j]=AlfClip$_L$[i][filtIdx[x][y]][j]
The luma filter coefficients and clipping values index idx are derived depending on transposeIdx[x][y] as follows:
If transposeIndex[x][y] is equal to 1, the following applies:

idx[ ]={9,4,10,8,1,5,11,7,3,0,2,6}

Otherwise, if transposeIndex[x][y] is equal to 2, the following applies:

idx[ ]={0,3,2,1,8,7,6,5,4,9,10,11}

Otherwise, if transposeIndex[x][y] is equal to 3, the following applies:

idx[ ]={9,8,10,4,3,7,11,5,1,0,2,6}

Otherwise, the following applies:

idx[ ]={0,1,2,3,4,5,6,7,8,9,10,11}

The locations (h$_{x+i}$, v$_{y+j}$) for each of the corresponding luma samples (x, y) inside the given array recPicture of luma samples with i, j=−3 . . . 3 are derived as follows:

$h_{x+i}$=Clip3(0,pic_width_in_luma_samples−1,xCtb+x+i)

$v_{y+j}$=Clip3(0,pic_height_in_luma_samples−1,yCtb+y+j)

The variables clipLeftPos, clipRightPos, clipTopPos, clipBottomPos, clipTopLeftFlag and clipBotRightFlag are derived by invoking the ALF boundary position derivation process as below with (xCtb, yCtb) and (x, y) as inputs.

[Object 13]
The variables h$_{x+i}$ and v$_{y+j}$ are modified by invoking the ALF sample padding process as specified in clause below with (xCtb, yCtb), (h$_{x+i}$, v$_{y+j}$), 0, clipLeftPos, clipRightPos, clipTopPos, clipBottomPos, clipTopleftFlag and clipBotRightFlag as input.
The variable applyAlfLineBufBoundary is derived as follows:
if the bottom boundary of the current coding tree block is the bottom boundary of current picture and pic_height_in_luma_samples−yCtb<=CtbSizeY−4, applyAlfLineBufBoundary is set equal to 0:
Otherwise, applyAlfLineBufBoundary is set equal to 1.
The vertical sample position offsets y1, y2, y3 and the variable alfShiftY are specified in Table 2 according to the vertical luma sample position y and applyAlfLineBufBoundary.

The variable curr is derived as follows:

curr=recPicture[$h_x$][$v_y$]

The variable sum is derived as follows:
[Object 14]

$$\begin{aligned}
\text{sum} = \\
f[idx[0]] * (\text{Clip3}(-c[idx[0]], c[idx[0]], recPicture[h_x][v_{y+y2}] - curr) + \\
\text{Clip3}(-c[idx[0]], c[idx[0]], recPicture[h_x][v_{y-y3}] - curr)) + \\
f[idx[1]] * (\text{Clip3}(-c[idx[1]], c[idx[1]], \\
recPicture[h_{x+1}][v_{y+y2}] - curr) + \text{Clip3}(-c[idx[1]], \\
c[idx[1]], recPicture[h_{x-1}][v_{y-y2}] - curr)) + f[idx[2]] * \\
(\text{Clip3}(-c[idx[2]], c[idx[2]], recPicture[h_x][v_{y+y2}] - curr) + \\
\text{Clip3}(-c[idx[2]], c[idx[2]], recPicture[h_x][v_{y-y2}] - curr)) + \\
f[idx[3]] * (\text{Clip3}(-c[idx[3]], c[idx[3]], \\
recPicture[h_{x-1}][v_{y+y2}] - curr) + \text{Clip3}(-c[idx[3]], \\
c[idx[3]], recPicture[h_{x+1}][v_{y-y2}] - curr)) + f[idx[4]] * \\
(\text{Clip3}(-c[idx[4]], c[idx[4]], recPicture[h_{x+2}][v_{y+y1}] - curr) + \\
\text{Clip3}(-c[idx[4]], c[idx[4]], recPicture[h_{x-2}][v_{y-y1}] - curr)) + \\
f[idx[5]] * (\text{Clip3}(-c[idx[5]], c[idx[5]], \\
recPicture[h_{x+1}][v_{y+y1}] - curr) + \text{Clip3}(-c[idx[5]], \\
c[idx[5]], recPicture[h_{x-1}][v_{y-y1}] - curr)) + f[idx[6]] * \\
(\text{Clip3}(-c[idx[6]], c[idx[6]], recPicture[h_x][v_{y+y1}] - curr) + \\
\text{Clip3}(-c[idx[6]], c[idx[6]], recPicture[h_x][v_{y-y1}] - curr)) + \\
f[idx[7]] * (\text{Clip3}(-c[idx[7]], c[idx[7]], \\
recPicture[h_{x-1}][v_{y+y1}] - curr) + \text{Clip3}(-c[idx[7]], \\
c[idx[7]], recPicture[h_{x+1}][v_{y-y1}] - curr)) + f[idx[8]] * \\
(\text{Clip3}(-c[idx[8]], c[idx[8]], recPicture[h_{x-2}][v_{y+y1}] - curr) + \\
\text{Clip3}(-c[idx[8]], c[idx[8]], recPicture[h_{x+2}][v_{y-y1}] - curr)) + \\
f[idx[9]] * (\text{Clip3}(-c[idx[9]], c[idx[9]], recPicture[h_{x+3}][v_y] - curr) + \\
\text{Clip3}(-c[idx[9]], c[idx[9]], recPicture[h_{x-3}][v_y] - curr)) + \\
f[idx[10]] * (\text{Clip3}(-c[idx[10]], c[idx[10]], \\
recPicture[h_{x+2}][v_y] - curr) + \text{Clip3}(-c[idx[10]], \\
c[idx[10]], recPicture[h_{x-2}][v_y] - curr)) + f[idx[11]] * \\
(\text{Clip3}(-c[idx[11]], c[idx[11]], recPicture[h_{x+1}][v_y] - curr) + \\
\text{Clip3}(-c[idx[11]], c[idx[11]], recPicture[h_{x-1}][v_y] - curr))
\end{aligned}$$

sum = curr + ((sum + 64) >> alfShifY)

[Object 15]

The modified filtered reconstructed luma picture sample alfPicture$_L$[xCtb+x][yCtb+y] is derived as follows:

alfPicture$_L$[xCtb+x][yCtb+y]=(Clip3(0,(1<<Bit-Depth)−1,sum)

TABLE 2

| Condition | alfShiftY | y1 | y2 | y3 |
|---|---|---|---|---|
| ( y = = CtbSizeY − 5 \|\| y = = CtbSizeY − 4 ) && ( applyAlfLineBufBoundary = = 1 ) | 10 | 0 | 0 | 0 |
| ( y = = CtbSizeY − 6 \|\| y = = CtbSizeY − 3 ) && ( applyAlfLineBufBoundary = = 1 ) | 7 | 1 | 1 | 1 |
| ( y = = CtbSizeY − 7 \|\| y = = CtbSizeY − 2 ) && ( applyAlfLineBufBoundary = = 1 ) | 7 | 1 | 2 | 2 |
| otherwise | 7 | 1 | 2 | 3 |

Derivation Process for ALF Transpose and Filter Index for Luma Samples
Inputs of this process are:
a luma location (xCtb, yCtb) specifying the top-left sample of the current luma coding tree block relative to the top left sample of the current picture,
a reconstructed luma picture sample array recPicture prior to the adaptive loop filtering process.
Outputs of this process are
the classification filter index array filtIdx[x][y] with x, y=0 . . . CtbSizeY−1,
the transpose index array transposeIdx[x][y] with x, y=0 . . . CtbSizeY−1.
[Object 16]
The variables ac[x][y], sumH[x][y], sumV[x][y], sumD0[x][y], sumD1[x][y] and sumOfHV[x][y] with x, y=0 . . . (CtbSizeY−1)>>2 are derived as follows:
The variables x4 and y4 are set as (x<<2) and (y<<2), respectively.
The variables minY, maxY, and ac[x][y] are derived as follows:
If y4 is equal to (CtbSizeY−8) and one of the following condition is true, minY is set equal to −2, maxY is set equal to 3, and ac[x][y] is set equal to 3.
The bottom boundary of the current coding tree block is the bottom boundary of the picture and pic_height_in_luma_samples−yCtb>CtbSizeY−4.
The bottom boundary of the current coding tree block is not the bottom boundary of the picture.
Otherwise, if y4 is equal to (CtbSizeY−4) and one of the following condition is true, minY is set equal to 0, maxY is set equal to 5, and ac[x][y] is set equal to 3.
The bottom boundary of the current, coding tree block is the bottom boundary of the picture and pic_height_in_luma_samples−yCtb>CtbSizeY−4.
The bottom boundary of the current coding tree block is not the bottom boundary of the picture
Otherwise, minY is set equal to −2 and maxY is set equal to 5, and ac[x][y] is set equal to 2.
The variables clipLeftPos, clipRightPos, clipTopPos, clipBottomPos, clipTopLeftFlag and clipBotRightFlag are derived by invoking the ALF boundary position derivation process as specified below with (xCtb, yCtb) and (x4, y4) as inputs.
[Object 17]
The locations ($h_{x4+i}$, $v_{y4+j}$) for each of the corresponding luma samples inside the given array recPicture of luma samples with i, j=−3 . . . 6 are derived as follows:

$h_{x4+i}$=(Clip3(0,pic_width_in_luma_samples−1,xCtb+x4+i)

$v_{y4+j}$=Clip3(0,pic_height_in_luma_samples−1,yCtb+y4+j)

The variables $h_{x4+i}$ and $v_{y4+j}$ are modified by invoking the ALF sample padding process as specified below with (xCtb, yCtb), ($h_{x4+i}$, $v_{y4+j}$), the variable isChroma set equal to 0, clipLeftPos, clipRightPos, clipTopPos, clipBottomPos, clipTopleftFlag and clipBotRightFlag as input.

The variables filtH[i][j], filtV[i][j], filtD0[i][j] and filtD1[i][j] with i, j=−2 . . . 5 are derived as follows:

If both i and j are even numbers or both i and j are not even numbers, the following applies:

$$filtH[i][j]=Abs((recPicture[h_{x4+i}][v_{y4+j}]<<1)-recPicture[h_{x4+i-1}][v_{y4+j}]-recPicture[h_{x4+i+1}][v_{y4+j}])$$

$$filtV[i][j]=Abs((recPicture[h_{x4+i}][v_{y4+j}]<<1)-recPicture[h_{x4+i-1}][v_{y4+j}]-recPicture[h_{x4+i+1}][v_{y4+j}])$$

$$filtD0[i][j]=Abs((recPicture[h_{x4+i}][v_{y4+j}]<<1)-recPicture[h_{x4+i-1}][v_{y4+j-1}]-recPicture[h_{x4+i+1}][v_{y4+j}])$$

$$filtD1[i][j]=Abs((recPicture[h_{x4+i}][v_{y4+j}]<<1)-recPicture[h_{x4+i-1}][v_{y4+j-1}]-recPicture[h_{x4+i+1}][v_{y4+j-1}])$$

Otherwise, filtH[i][j], filtV[i][j], filtD0[i][j] and filtD1[i][j] are set equal to 0.

[Object 18]

The variables sumH[x][y], sumV[x][y], sumD0[x][y], sumD1[x][y] and sumOfHV[x][y] are derived as follows:

$$sumH[x][y]=\Sigma_i\Sigma_j filtH[i][j], \text{with } i=-2 \ldots 5, j=minY \ldots maxY$$

$$sumV[x][y]=\Sigma_i\Sigma_j filtV[i][j], \text{with } i=-2 \ldots 5, j=minY \ldots maxY$$

$$sumD0[x][y]=\Sigma_i\Sigma_j filtD0[i][j], \text{with } i=-2 \ldots 5, j=minY \ldots maxY$$

$$sumD1[x][y]=\Sigma_i\Sigma_j filtD1[i][j], \text{with } i=-2 \ldots 5, j=minY \ldots maxY$$

$$sumOfHV[x][y]=sumH[x][y]+sumV[x][y]$$

The classification filter index array filtIdx and transpose index array transposeIdx are derived by the following steps:

1. The variables dir1[x][y], dir2[x][y] and dirS[x][y] with x, y=0 . . . CtbSizeY−1 are derived as follows:

The variables hv1, hv0 and dirHV are derived as follows:

If sumV[x>>2][y>>2] is greater than sumH[x>>2][y>>2], the following applies:

$$hv1=sumV[x>>2][y>>2]$$

$$hv0=sumH[x>>2][y>>2]$$

$$dirHV=1$$

Otherwise, the following applies:

$$hv1=sumH[x>>2][y>>2]$$

$$hv0=sumV[x>>2][y>>2]$$

$$dirHV=3$$

[Object 19]

The variables d1, d0 and dirD are derived as follows:

If sumD0[x>>2][y>>2] is greater than sumD1[x>>2][y>>2], the following applies:

$$d1=sumD0[x>>2][y>>2]$$

$$d0=sumD1[x>>2][y>>2]$$

$$dirD=0$$

Otherwise, the following applies:

$$d1=sumD1[x>>2][y>>2]$$

$$d0=sumD0[x>>2][y>>2]$$

$$dirD=2$$

The variables hvd1, hvd0, are derived as follows:

$$hvd1=(d1*hv0>hv1*d0)?d1:hv1$$

$$hvd0=(d1*hv0>hv1*d0)?d0:hv0$$

The variables dirS[x][y], dir1[x][y] and dir2[x][y] derived as follows:

$$dir1[x][y](d1*hv0>hv1*d0)?dirD:dirHV$$

$$dir2[x][y](d1*hv0>hv1*d0)?dirHV:dirD$$

$$dirS[x][y]=(hvd1*2>9*hdv0)?2:((hvd1>2*hvd0)?1:0)$$

2. The variable avgVar[x][y] with x, y=0 . . . CtbSizeY−1 is derived as follows:

$$varTab [ ]=;0,1,2,2,2,2,2,3,3,3,3,3,3,3,3,4;$$

$$avgVar[x][y]=varTab[Clip3(0,15,(sumOfHV[x>>2][y>>2]*ac[x>>2][y>>2])>>(BitDepth-1))]$$

[Object 20]

3. The classification filter index array filtIdx[x][y] and the transpose index array transposeIdx[x][y] with x=y=0 . . . CtbSizeY−1 are derived as follows:

$$transposeTable[ ]=\{0,1,0,2,2,3,1,3\}$$

$$transposeIdx[x][y]=transposeTable[dir1[x][y]*2+(dir2[x][y]>>1)]$$

$$filtIdx[x][y]=avgVar[x][y]$$

When dirS[x][y] is not equal 0, filtIdx[x][y] is modified as follows:

$$filtIdx[x][y]+=(((dir1[x][y]\&0x1)<<<)+dirS[x][y])*5$$

Coding Tree Block Filtering Process for Chroma Samples

Inputs of this process are:
a reconstructed chroma picture sample array recPicture prior to the adaptive loop filtering process,
a filtered reconstructed chroma picture sample array alfPicture,
a chroma location (xCtbC, yCtbC) specifying the top-left sample of the current chroma coding tree block relative to the top left sample of the current picture,
an alternative chroma filter index altIdx.

Output of this process is the modified filtered reconstructed chroma picture sample array alfPicture.

The width and height of the current chroma coding tree block ctbWidthC and ctbHeightC is derived as follows:

$$ctbWidthC=CtbSizeY/SubWidthC$$

$$ctbHeightC=CtbSizeY/SubHeightC$$

For the derivation of the filtered reconstructed chroma samples alfPicture[x][y], each reconstructed chroma sample inside the current chroma coding tree block recPicture[x][y] is filtered as follows with x=0 . . . ctbWidthC−1, y=0 . . . ctbHeightC−1:

[Object 21]

The locations ($h_{x+i}$, $v_{y+j}$) for each of the corresponding chroma samples (x, y) inside the given array recPicture of chroma samples with i, j=−2 . . . 2 are derived as follows:

$h_{x+i}$=Clip3(0,pic_width_in_luma_samples/SubWidthC−1,xCtbC+x+i)

$v_{y+j}$=Clip3(0,pic_height_in_luma_samples/SubHeightC−1,yCtbC+y+j)

The variables clipLeftPos, clipRightPos, clipTopPos, clipBottomPos, clipTopleftFlag and clipBotRightFlag are derived by invoking the ALF boundary position derivation process as specified below with (xCtbC*SubWidthC, yCtbC*SubHeightC) and (x*SubWidthC, y*SubHeightC) as inputs.

The variables $h_{x+i}$ and $v_{y+i}$ are modified by invoking the ALF sample padding process as specified below with (xCtb, yCtb), ($h_{x+i}$, $v_{y+j}$), the variable isChroma set equal to 1, clipLeftPos, clipRightPos, clipTopPos, clipBottomPos, clipTopLeftFlag and clipBotRightFlag as input.

The variable applyAlfLineBufBoundary is derived as follows:

If the bottom boundary of the current coding tree block is the bottom boundary of the picture and pic_height_in_luma_samples−(yCtbC*SubHeightC)<CtbSizeY−4, applyAlfLineBufBoundary is set equal to 0.

Otherwise, applyAlfLineBufBoundary is set equal to 1.

The vertical sample position offsets y1, y2 and the variable alfShiftC are specified in Table 3 according to the vertical chroma sample position y and applyAlfLineBufBoundary.

The variable curr is derived as follows:

curr=recPicture[$h_x$][$v_y$]

The array of chroma filter coefficients f[j] and the array of chroma clipping values c[j] is derived as follows with j=0 . . . 5:

f[j]=AlfCoeff$_C$[slice_alf_aps_id_chroma][altIdx][j]

c[j]=AlfClip$_C$[slice_alf_aps_id_chroma][altIdx][j]

[Object 22]

The variable sum is derived as follows:

sum=f[0]*(Clip3(−c[0],c[0],recPicture[$h_x$][$v_{y+y2}$]−curr)+Clip3(−c[0],c[0],recPicture[$h_x$][$v_{y-y2}$]−curr))+f[1]*(Clip3(−c[1],c[1],recPicture[$h_{x+1}$][$v_{y+y1}$]−curr)+Clip3(−c[1],c[1],recPicture[$h_{x-1}$][$v_{y+y1}$]−curr)+f[2]*(Clip3(−c[2],c[2],recPicture[$h_x$][$v_{y+y1}$]−curr)+Clip3(−c[2],c[2],recPicture[$h_x$][$v_{y+y1}$]−curr))+f[3]*(Clip3(−c[3],c[3],recPicture[$h_{x-1}$][$v_{y+y1}$]−curr)+Clip3(−c[3],c[3],recPicture[$h_{x-1}$][$v_{y+y1}$]−curr))+f[4]*(Clip3(−c[4],c[4],recPicture[$h_{x+2}$][$v_y$]−curr)+Clip3(−c[4],c[4],recPicture[$h_{x-2}$][$v_y$]−curr))+f[5]*(Clip3(−c[5],c[5],recPicture[$h_{x+1}$][$v_y$]−curr)+Clip3(−c[5],c[5],recPicture[$h_{x+1}$][$v_y$]−curr))

sum curr+((sum+64)>>alfShiftC)

The modified filtered reconstructed chroma picture sample alfPicture[xCtbC+x][yCtbC+y] is derived as follows:

alfPicture[xCtbC+x][yCbtC+y]=Clip3(0,(1<<:BitDepth)−1,sum)

TABLE 3

| Condition | alfShiftC | y1 | y2 |
|---|---|---|---|
| ( y = = ctbHeightC − 2 \|\| y = = ctbHeightC − 3 ) && ( applyAlfLineBufBoundary = = 1 ) | 10 | 0 | 0 |
| ( y = = ctbHeightC − 1 \|\| y = = ctbHeightC − 4 ) && ( applyAlfLineBufBoundary = = 1 ) | 7 | 1 | 1 |
| Otherwise | 7 | 1 | 2 |

[Object 23]

ALF Boundary Position Derivation Process

Inputs of this process are:

a luma location (xCtb, yCtb) specifying the top-left sample of the current luma coding tree block relative to the top left sample of the current picture, a luma location (x,y) specifying the current sample relative to the top-left sample of the current luma coding tree block.

Output of this process are:

the left vertical boundary position clipLeftPos.

the right vertical boundary position clipRightPos, the above horizontal boundary position ClipTopPos, the below horizontal boundary position clipBottomPos.

the top left boundary flag clipTopleftFlag, the bottom right boundary flag clipBotRightFlag.

The variables clipLeftPos, clipRightPos, clipTopPos and clipBottomPos are set equal to −128.

The variables clipTopLeftFlag and clipBotRightFlag are both set equal to 0.

The variable clipTopPos is modified as follows:

If y−(CtbSizeY−4) is greater than or equal to 0, the variable clipTopPos is set equal to yCtb+CtbSizeY−4.

Otherwise, if VirtualBoundariesPresentFlag is equal to 1, and yCtb+y−VirtualBoundariesPosY[n] is greater than or equal to 0 and less than 3 for any n=0 . . . NumHorVirtualBoundaries−1, the following applies:

clipTopPos=VirtualBoundaresPosY[n]

Otherwise, if y is less than 3 and one or more of the following conditions are true, the variable clipTopPos is set equal to yCtb:

The top boundary of the current coding tree block is the top boundary of the tile, and loop_filter_across_tiles_enabled_flag is equal to 0.

The top boundary of the current coding tree block is the top boundary of the slice, and loop_filter_across_slices_enabled_flag is equal to 0.

[Object 24]

The top boundary of the current coding tree block is the top boundary of the subpicture, and loop_filter_across_subpic_enabled_flag[CurrSubpicIdx] is equal to 0.

The variable clipBottomPos is modified as follows:

If VirtualBoundariesPresentFlag is equal to 1, VirtualBoundariesPosY[n] is not equal to pic_height_in_luma_samples−1 or 0, and VirtualBoundariesPosY[n]−yCtb−y is greater than 0 and less than 5 for any n=0 . . . NumHorVirtualBoundaries−1, the following applies:

clipBottomPos=VirtualBoundariesPosY[n]

Otherwise, if CtbSizeY−4−y is greater than 0 and is less than 5, the variable clipBottomPos is set equal to yCtb+CtbSizeY−4.

Otherwise, if CtbSizeY−y is less than 5, and one or more of the following conditions are true, the variable clipBottomPos is set equal to yCtb+CtbSizeY:

The bottom boundary of the current coding tree block is the bottom boundary of the tile, and loop_fiter_across_tiles_enabled_flag is equal to 0.

The bottom boundary of the current coding tree block is the bottom boundary of the slice, and loop_filter_across_slices_enabled_flag is equal to 0.

The bottom boundary of the current coding tree block is the bottom boundary of the subpicture, and loop_filter_across_subpic_enabled_flag[CurrSubpicIdx] is equal to 0.

[Object 25]

The variable clipLeftPos is modified as follows:

If VirtualBoundariesPresentFlag is equal to 1, and xCtb+x−VirtualBoundariesPosX[n] is greater than or equal to 0 and less than 3 for any n=0 . . . NumVerVirtualBoundaries−1, the following applies:

clipLeftPos=VirtualBoundariesPos*X*[*n*]

Otherwise, if x is less than 3, and one or more of the following conditions are true, the variable clipLeftPos is set equal to xCtb:

The left boundary of the current coding tree block is the left boundary of the tile, and loop_filter_across_tiles_enabled_flag is equal to 0.

The left boundary of the current coding tree block is the left boundary of the slice, and loop_filter_across_slices_enabled_flag is equal to 0.

The left boundary of the current coding tree block is the left boundary of the subpicture, and loop_filter_across_subpic_enabled_flag[CurrSubpicIdx] is equal to 0.

The variable clipRightPos is modified as follows:

If VirtualBoundariesPresentFlag is equal to 1, and VirtualBoundariesPosX[n]−xCtb−x is greater than 0 and less than 5 for any n=0 . . . NumVerVirtualBoundaries−1, the following applies:

clipRightPos=VirtualBoundariesPos*X*[*n*]

Otherwise, if CtbSizeY−x is less than 5, and one or more of the following conditions are true, the variable clipRightPos is set equal to xCtb+CtbSizeY:

The right boundary of the current coding tree block is the right boundary of the tile, and loop_filter_across_tiles_enabled_flag is equal to 0.

The right boundary of the current coding tree block is the right boundary of the slice, and loop_filter_across_slices_enabled_flag is equal to 0.

The right boundary of the current coding tree block is the right boundary of the subpicture, and loop_filter_across_subpic_enabled_flag[CurrSubpicIdx] is equal to 0.

[Object 26]

The variable clipTopLeftFlag and clipBotRightFlag are modified as following:

If the coding tree block covering the luma position (xCtb, yCtb) and the coding tree block covering the luma position (xCtb−CtbSizeY, yCtb−CtbSizeY) belong to different slices, and loop_filter_across_slices_enabled_flag is equal to 0, clipTopLeftFlag is set equal to 1.

if the coding tree block covering the luma position (xCtb, yCtb) and the coding tree block covering the luma position (xCtb+CtbSizeY, yCtb+CtbSizeY) belong to different slices, and loop_filter_across_slices_enabled_flag is equal to 0, clipBotRightFlag is set equal to 1.

ALF Sample Padding Process

Inputs of this process are:

a luma location (xCtb, yCtb) specifying the top-left sample of the current luma coding tree block relative to the top left sample of the current picture.

a luma location (x,y) specifying the neighbouring sample relative to the top-left sample of the current picture, a flag isChroma specifying whether the colour component is chroma component or not, the left vertical boundary position clipLeftPos, the right vertical boundary position clipRightPos.

the above horizontal boundary position clipTopPos, the below horizontal boundary position clipBottomPos, the top left, boundary flag clipTopLeftFlag.

the bottom right boundary flag clipBotRightFlag.

Outputs of this process are:

modified luma location (x, y) specifying the neighbouring sample relative to the top-left sample of the current picture,

[Object 27]

The variables picWidth, picHeight, xCtbCur, yCtbCur, CtbSizeHor, CtbSizeVer, topBry, botBry, leftBry and rightBry are derived as follows:

picWidth=isChroma?pic_width_in_luma_samples/SubWidth*C*: pic_width_in_luma_samples picHeight=isChroma?pic_height_in_luma_samples/SubHeight*C*: pic_height_in_luma_samples x*Ctb*Cur=isChroma?*xCtb*/SubWidth*C*:*xCtb* y*Ctb*Cur=isChroma?*yCtb*/SubHeight*C*:*yCtb*

*ctb*SizeHor=isChroma?CtbSize*Y*/SubWidth*C*:*Ctb*Size*Y*

*ctb*SizeVer=isChroma?CtbSize*Y*/SubHeight*C*:*Ctb*Size*Y* topBryPos=isChroma?clipTopPos/SubHeight*C*:clipTopPos botBryPos=isChroma?clipBottomPos/SubHeight*C*: clipBottomPos leftBryPos=isChroma?clipLeftPos/SubWidth*C*:clipRightPos rightBryPos=isChroma?clipRightPos/SubWidth*C*: clipRightPos The variables (x, y) is modified as follows:

When topBryPos is not less than 0, the following applies:

*y*=Clip3(topBryPos,picHeight−1,*y*)

When botBryPos is not less than 0, the following applies:

*y*=Clip3(0,botBryPos=1,*y*)

When leftBryPos is not less than 0, the following applies:

*x*=Clip3(leftBryPos,picWidth−1,*x*)

When rightBryPos is nut less than 0, the following applies:

*x*=Clip3(0,rightBryPos−1,*x*)

[Object 28]

(x,y) is set equal to (xCtbCur, y) if all of the following conditions are true:

clipTopLeftFlag is equal to true topBryPos is less than 0 and leftBryPos is less than 0 x is less than xCtbCur and y is less than yCtbCur (x,y) is set equal to (xCtbCur+CtbSizeHor−1, y) if all of the following conditions are true:
   clipBotRightFlag is equal to true
   botBryPos is less than 0 and rightBryPos is less than 0
   x is greater than xCtbCur+CtbSizeHor−1 and y is greater than yCtbCur+CtbSizeVer−1

Cross-Component Filtering Process

Inputs of this process are:
   a reconstructed luma picture sample array recPicture$_L$ prior to the luma adaptive loop filtering process.
   a filtered reconstructed chroma picture sample array alfPicture$_C$,
   a chroma location (xCtbC, yCtbC) specifying the top-left sample of the current chroma coding tree block relative to the top-left sample of the current picture,
   a CTB width ccAlfWidth in chroma samples,
   a CTB height ccAlfHeight in chroma samples,
   cross-component filter coefficients CcAlfCoeff[j], with j=0 . . . 6.

Output of this process is the modified filtered reconstructed chroma picture sample array ccAlfPicture.

For the derivation of the filtered reconstructed chroma samples ccAlfPicture[xCtbC+x][yCtbC+y], each reconstructed chroma sample inside the current chroma block of samples alfPicture$_C$[xCtbC+x][yCtbC+y] with x=0 . . . ccAlfWidth−1, y=0 . . . ccAlfHeight−1, is filtered as follows:

[Object 29]
The luma location (xL, yL) corresponding to the current chroma sample at chroma location (xCtbC+x, yCtbC+v) is set equal to ((xCtbC+x)*SubWidthC, (yCtbC+y)*SubHeightC).

The luma locations ($h_{x+i}$, $v_{y+j}$) with i=−1 . . . 1, j=−1.2 inside the array recPicture$_L$ are derived as follows:

$$h_{x+j} = Clip3(0, pic\_width\_in\_luma\_samples-1, xL+i)$$

$$v_{y+j} = Clip3(0, pic\_height\_in\_luma\_samples-1, yL+j)$$

The variables clipLeftPos, clipRightPos, clipTopPos, clipBottomPos, clipTopLeftFlag and clipBotRightFlag are derived by invoking the ALF boundary position derivation process as specified above with (xCtbC*SubWidthC, yCtbC*SubHeightC) and (x*SubWidthC, y*SubHeightC) as inputs.

The variables $h_{x+i}$ and $v_{y+j}$ are modified by invoking the ALF sample padding process as specified above with (xCtbC*SubWidthC, yCtbC*SubHeightC), ($h_{x+i}$, $v_{y+j}$), the variable isChroma set equal to 0, clipLeftPos, clipRightPos, clipTopPos, clipBottomPos, clipTopLeftFlag and clipBotRightFlag as input.

The variable applyAlfLineBufBoundary is derived as follows:
   If the bottom boundary of the current coding tree block is the bottom boundary of current picture and pic_height_in_luma_samples−yCtbC*SubHeightC is less then or equal to CtbSizeY−4, applyAlfLineBufBoundary is set equal to 0.
   Otherwise, applyAlfLineBufBoundary is Set equal to 1.

The vertical sample position offsets yP1 and yP2 are specified in Table 4 according to the vertical luma sample position (y*SubHeightC) and applyAlfLineBufBoundary.

The variable curr is derived as follows:

$$curr = alfPicture_C[xCtbC+x][yCtbC+y]$$

[Object 30]
The array of cross-component filter coefficients f[j] is derived as follows with j=0 . . . 6:

$$f[j] = CcAlfCoeff[j]$$

The variable sum is derived as follows:

$$\begin{aligned}sum = &f[0]*(recPicture_L[h_x][v_{y+P1}] - recPicture_L[h_x][v_y]) \\&+ f[1]*(recPicture_L[h_{x-1}][v_y] - recPicture_L[h_x][v_y]) \\&+ f[2]*(recPicture_L[h_{x-1}][v_y] - recPicture_L[h_x][v_y]) \\&+ f[3]*(recPicture_L[h_{x-1}][v_{y+P1}] - recPicture_L[h_x][v_y]) \\&+ f[4]*(recPicture_L[h_x][v_{y+yP1}] - recPicture_L[h_x][v_y]) \\&+ f[5]*(recPicture_L[h_{x+1}][v_{y+yP1}] - recPicture_L[h_x][v_y]) \\&+ f[6]*(recPicture_L[h_x][v_{y+yP2}] - recPicture_L[h_x][v_y])\end{aligned}$$

$$scaledSum = Clip3(-(1<<(BitDepth-1)), (1<<(BitDepth-1))-1, (sum+64)>>7)$$

$$sum = curr + scaledSum$$

The modified filtered reconstructed chroma picture sample ccAlfPicture[xCtbC+x][yCtbC+y] is derived as follows:

$$ccAlfPicture[xCtbC+x][yCtbC+y] Clip3(0, (1<BitDepth)-1, sum)$$

TABLE 4

| Condition | yP1 | yP2 |
|---|---|---|
| ( y * subHeightC == CtbSizeY − 5 \|\| y * subHeightC == CtbSizeY − 4 ) && applyAlfLineBufBoundary == 1 | 0 | 0 |
| ( y * subHeightC == CtbSizeY − 6 \|\| y * subHeightC == CtbSizeY − 3 ) && applyAlfLineBufBoundary == 1 | 1 | 1 |
| Otherwise | 1 | 2 |

[Object 31]
As provided above, in JVET-Q2001, for the Coding tee block filtering process for luma samples and the Coding tree block filtering process for chroma samples, a variable sum, which provides a modified filtered reconstructed picture sample is respectively calculated as follows:

$$sum = curr + ((sum+64)>>alfShiftY)$$

AND $$sum = curr + ((sum+64)>>alfShiftC)$$

Each of these calculations include the fixed value 64. This results in a less than ideal filtered sample value.

[Object 32]
Further, as provided above, in JVET-Q2001, for the Cross component filtering process, a variable scaledsum, which is used to calculate a variable sum is calculated as follows:

$$scaledSum = Clip3(-(1<<(BitDepth-1)), (1<<BitDepth-1))-1, (sum+64)>>7)$$

This calculation also includes the fixed value 64. This results in a less than ideal filtered sample value.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
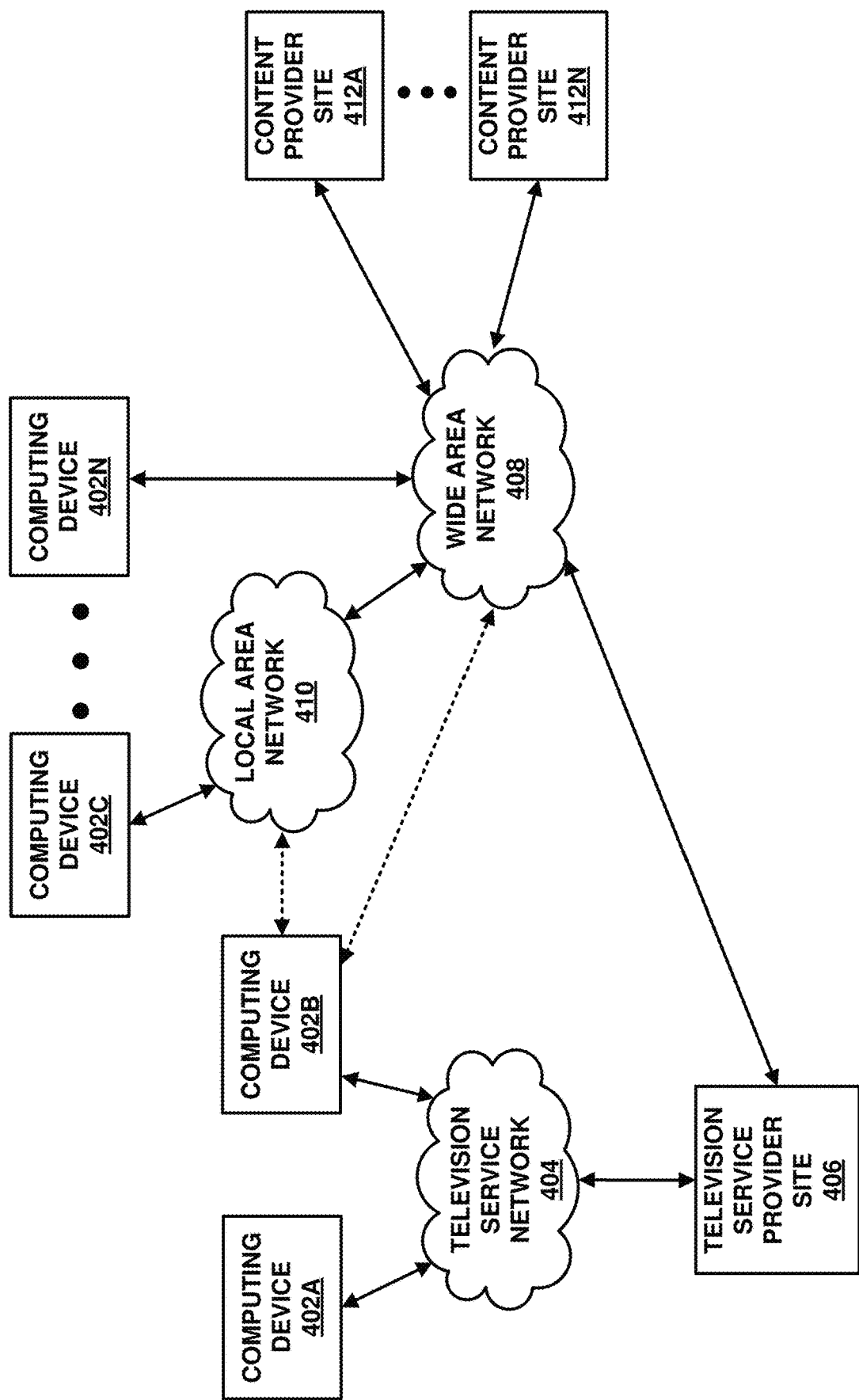
FIG. 4 is a conceptual drawing illustrating an example of components that may be included in an implementation of a system that may be configured to encode and decode video data according to one or more techniques of this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3$^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
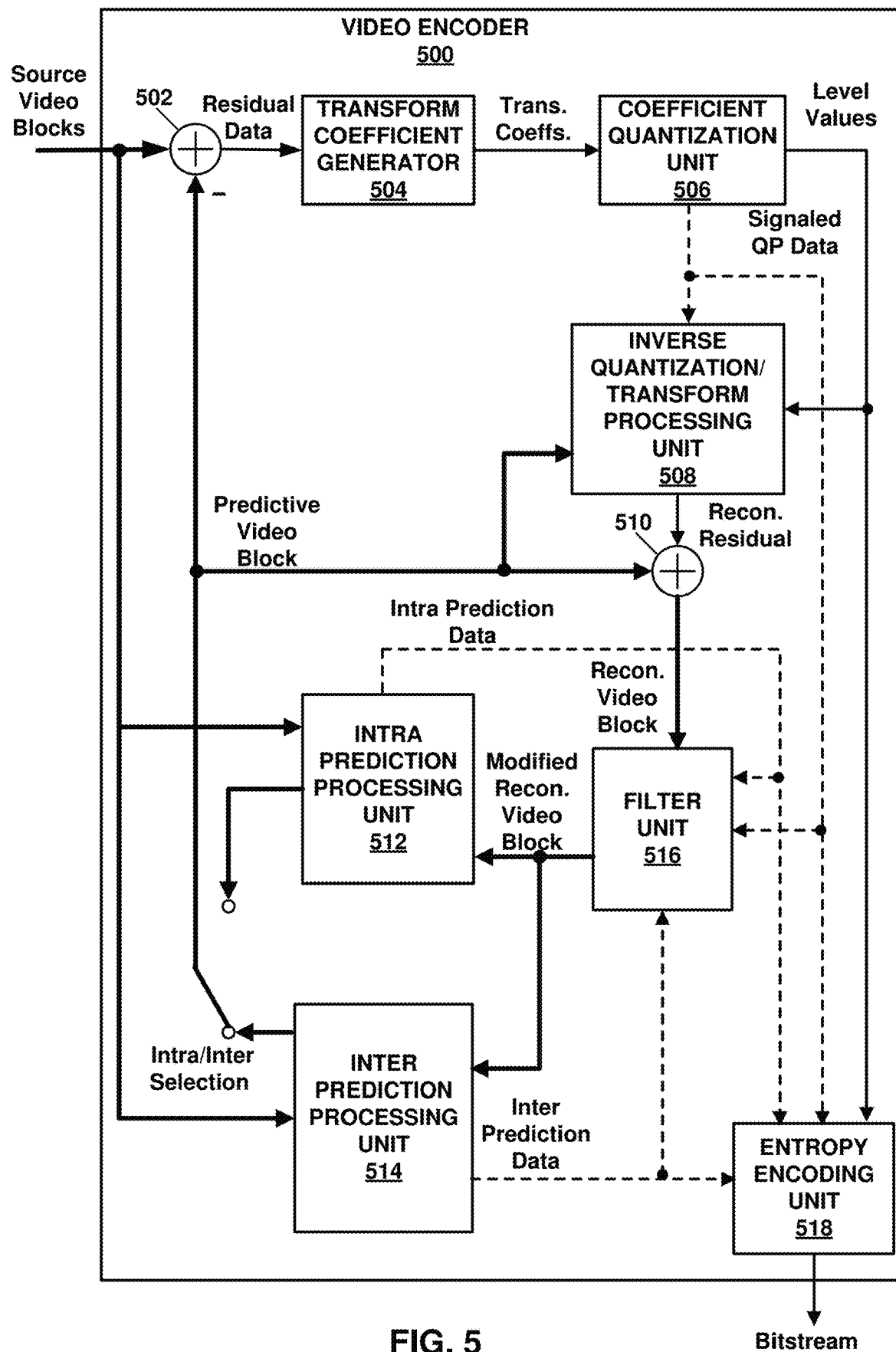
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization.

Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a prediction mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a prediction unit of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking, SAO, and ALF filtering, as described above. It should be noted that as illustrated in FIG. 5, intra prediction processing unit 512 and inter prediction processing unit 514 may receive modified reconstructed video block via filter unit 216. As described above, in JVET-Q2001, the calculations of the variable sum for generating modified filtered reconstructed pictures samples is less than ideal.

[Object 33]

In one example, according to the technique herein, a modified filtered reconstructed luma picture sample alfPictureL[xCtb+x][yCtb+y] may be derived as follows, where the rounding offset added to the variable sum is matched to the shift amount alfShiftY:

$$curr = recPicture[h_x][h_y]$$

$$\begin{aligned}
sum = &\ f[idx[0]] * (Clip3(-c[idx[0]], c[idx[0]], recPicture[h_x][v_{y+y3}] - curr) + \\
&\ Clip3(-c[idx[0]], c[idx[0]], recPicture[h_x][v_{y-y3}] - curr)) + \\
&\ f[idx[1]] * (Clip3(-c[idx[1]], c[idx[1]], \\
&\ recPicture[h_{x+1}][v_{y+y2}] - curr) + Clip3(-c[idx[1]], \\
&\ c[idx[1]], recPicture[h_{x-1}][v_{y-y2}] - curr)) + f[idx[2]] * \\
&\ (Clip3(-c[idx[2]], c[idx[2]], recPicture[h_x][v_{y+y2}] - curr) + \\
&\ Clip3(-c[idx[2]], c[idx[2]], recPicture[h_x][v_{y-y2}] - curr)) + \\
&\ f[idx[3]] * (Clip3(-c[idx[3]], c[idx[3]], \\
&\ recPicture[h_{x-1}][v_{y+y2}] - curr) + Clip3(-c[idx[3]], \\
&\ c[idx[3]], recPicture[h_{x+1}][v_{y-y2}] - curr)) + f[idx[4]] * \\
&\ (Clip3(-c[idx[4]], c[idx[4]], recPicture[h_{x+2}][v_{y+y1}] - curr) + \\
&\ Clip3(-c[idx[4]], c[idx[4]], recPicture[h_{x-2}][v_{y-y1}] - curr)) + \\
&\ f[idx[5]] * (Clip3(-c[idx[5]], c[idx[5]], \\
&\ recPicture[h_{x+1}][v_{y+y1}] - curr) + Clip3(-c[idx[5]], \\
&\ c[idx[5]], recPicture[h_{x-1}][v_{y-y1}] - curr)) + f[idx[6]] * \\
&\ (Clip3(-c[idx[6]], c[idx[6]], recPicture[h_x][v_{y+y1}] - curr) + \\
&\ Clip3(-c[idx[6]], c[idx[6]], recPicture[h_x][v_{y-y1}] - curr)) + \\
&\ f[idx[7]] * (Clip3(-c[idx[7]], c[idx[7]], \\
&\ recPicture[h_{x-1}][v_{y+y1}] - curr) + Clip3(-c[idx[7]], \\
&\ c[idx[7]], recPicture[h_{x+1}][v_{y-y1}] - curr)) + f[idx[8]] * \\
&\ (Clip3(-c[idx[8]], c[idx[8]], recPicture[h_{x-2}][v_{y+y1}] - curr) + Clip \\
&\ 3(-c[idx[8]], c[idx[8]], recPicture[h_{x+2}][v_{y-y1}] - curr)) + \\
&\ f[idx[9]] * (Clip3(-c[idx[9]], c[idx[9]], recPicture[h_{x+3}][v_y] - curr) + \\
&\ Clip3(-c[idx[9]], c[idx[9]], recPicture[h_{x-3}][v_y] - curr)) + \\
&\ f[idx[10]] * (Clip3(-c[idx[10]], c[idx[10]], \\
&\ recPicture[h_{x+2}][v_y] - curr) + Clip3(-c[idx[10]], \\
&\ c[idx[10]], recPicture[h_{x-2}][v_y] - curr)) + f[idx[11]] * \\
&\ (Clip3(-c[idx[11]], c[idx[11]], recPicture[h_{x+1}][v_y] - curr) + \\
&\ Clip3(-c[idx[11]], c[idx[11]], recPicture[h_{x-1}][v_y] - curr))
\end{aligned}$$

[Object 34]

$$sum = curr + ((sum + (1 << alfShiftY >> 1)) >> alfShiftY)$$

$$alfPicture_L[xCtb+x][yCtb+y] = Clip3(0, (1 << BitDepth) - 1, sum)$$

Where, the vertical sample position offsets y1, y2, y3 and the variable alfShiftY are specified in Table 2 above according to the vertical luma sample position y and applyAlfLineBufBoundary.

[Object 35]

In one example, according to the technique herein, modified filtered reconstructed chroma picture sample alfPicture[xCtbC+x][yCtbC+y] may be derived as follows:

curr=recPicture[$h_x$][$v_y$]

The array of chroma filter coefficients f[j] and the array of chroma clipping values c[j] is derived as follows with j=0 . . . 5:

f[j]=AlfCoeff$_C$[slice_alf_aps_id_chroma][altIdx][j]

c[j]=AlfClip$_C$[slice_alf_aps_id_chroma][altIdx][j]

The variable sum is derived as follows:

$$\text{sum} = f[0] * (\text{Clip3}(-c[0], c[0], \text{recPicture}[h_x][v_{y+y2}] - \text{curr}) +$$
$$\text{Clip3}(-c[0], c[0], \text{recPicture}[h_x][v_{y-y2}] - \text{curr})) +$$
$$f[1] * (\text{Clip3}(-c[1], c[1], \text{recPicture}[h_{x-1}][v_{y+y1}] - \text{curr}) +$$
$$\text{Clip3}(-c[1], c[1], \text{recPicture}[h_{x+1}][v_{y-y1}] - \text{curr})) +$$
$$f[2] * (\text{Clip3}(-c[2], c[2], \text{recPicture}[h_x][v_{y+y1}] - \text{curr}) +$$
$$\text{Clip3}(-c[2], c[2], \text{recPicture}[h_x][v_{y-y1}] - \text{curr})) +$$
$$f[3] * (\text{Clip3}(-c[3], c[3], \text{recPicture}[h_{x-1}][v_{y+y1}] - \text{curr}) +$$
$$\text{Clip3}(-c[3], c[3], \text{recPicture}[h_{x+1}][v_{y+y1}] - \text{curr})) +$$
$$f[4] * (\text{Clip3}(-c[4], c[4], \text{recPicture}[h_{x-2}][v_y] - \text{curr}) +$$
$$\text{Clip3}(-c[4], c[4], \text{recPicture}[h_{x+2}][v_y] - \text{curr})) +$$
$$f[5] * (\text{Clip3}(-c[5], c[5], \text{recPicture}[h_{x+1}][v_y] - \text{curr}) +$$
$$\text{Clip3}(-c[5], c[5], \text{recPicture}[h_{x+1}][v_y] - \text{curr}))$$

$$\text{sum} = \text{curr} + ((\text{sum} + (1 \langle\langle \text{alfShiftC}\rangle\rangle 1)) >> \text{alfShiftC})$$

$$\text{alfPicture}[xCtbC + x][yCtbC + y] = \text{Clip3}(0, (1 << \text{BitDepth}) - 1, \text{sum})$$

Where, the vertical sample position offsets y1, y2 and the variable alfShiftC are specified in Table 3 according to the vertical chroma sample position y and applyAlfLineBufBoundary.

[Object 36]

In one example, according to the technique herein a modified filtered reconstructed chroma, picture sample ccAlfPicture[xCtbC+x][yCtbC+y] may be derived as follows:

The variable curr is derived as follows:

curr=alfPicture$_C$[$xCtbC+x$][$yCtbC+y$]

The array of cross-component filter coefficients f[j] is derived as follows with j=0 . . . 6:

[j]=CcAlfCoeff[j]

The variable sum is derived as follows:

$$\text{sum} = f[0] * (\text{recPicture}_L[h_x][v_{y+yP1}] - \text{recPicture}_L[h_x][v_y]) +$$
$$f[1] * (\text{recPicture}_L[h_{x-1}][v_y] - \text{recPicture}_L[h_x][v_y]) +$$
$$f[2] * (\text{recPicture}_L[h_{x+1}][v_y] - \text{recPicture}_L[h_x][v_y]) +$$
$$f[3] * (\text{recPicture}_L[h_{x-1}][v_{y+yP1}] - \text{recPicture}_L[h_x][v_y]) +$$
$$f[4] * (\text{recPicture}_L[h_x][v_{y+yP1}] - \text{recPicture}_L[h_x][v_y]) +$$
$$f[5] * (\text{recPicture}_L[h_{x+1}][v_{y+yP1}] - \text{recPicture}_L[h_x][v_y]) +$$
$$f[6] * (\text{recPicture}_L[h_x][v_{y+yP2}] - \text{recPicture}_L[h_x][v_y])$$

$$\text{scaledSum} = \text{Clip3}(-(1 << (\text{BitDepth} - 1)), (1 << (\text{BitDepth} - 1)) - 1,$$
$$(\text{sum} + (1 \langle\langle \text{ccalfShiftC}\rangle\rangle 1)) >> \text{ccalfShiftC})$$

$$\text{sum} = \text{curr} + \text{scaledSum}$$

$$\text{ccAlfPicture}[xCtbC + x][yCtb + y] = \text{Clip3}(0, (1 << \text{BitDepth}) - 1, \text{sum})$$

Where, the vertical sample position offsets yP1 and yP2 are specified in Table 5 according to the vertical luma sample position (y*subHeightC) and applyAlfLineBufBoundary. It should be noted that when ccalfShiftC is set to BitDepth+11, the value scaledSum is always equal to 0. In such case, ccalfShiftC may alternatively be set to a larger value that is independent of BitDepth, for example value 31.

[Object 37]

TABLE 5

| Condition | ccalfShiftC | yP1 | vP2 |
|---|---|---|---|
| ( y * subHeightC = = CtbSizeY − 5 \|\| ( y * subHeightC = = CtbSizeY − 4 && subHeightC = = 2 ) ) && applyAlfLineBufBoundary = = 1 | 10 | 0 | 0 |
| y * subHeightC > CtbSizeY − 5 && y * subHeightC < CtbSizeY − 2 * subHeightC && applyAlfLineBufBoundary = = 1 | BitDepth + 11 | 0 | 0 |
| y * subHeightC = = CtbSizeY − 6 && applyAlfLineBufBoundary = = 1 | 7 | 1 | 1 |
| Otherwise | 7 | 1 | 2 |

In one example, the vertical sample position offsets yP1 and yP2 may be specified in Table 6 according to the vertical luma sample position (y*subHeightC) and applyAlfLineBufBoundary

TABLE 6

| Condition | ccalfShiftC | yP1 | yP2 |
|---|---|---|---|
| ( y * subHeightC = = CtbSizeY − 5 \|\| ( y * subHeightC = = CtbSizeY − 4 && subHeightC = = 2 ) ) && applyAlfLineBufBoundary = = 1 | 10 | 0 | 0 |
| (y * subHeightC = = CtbSizeY − 3 \|\| y * subHeightC = = CtbSizeY − 4 && subHeightC = = 1 ) ) && applyAlfLineBufBoundary = = 1 | BitDepth + 11 | 0 | 0 |
| y * subHeightC = = CtbSizeY − 6 && applyAlfLineBufBoundary = = 1 | 7 | 1 | 1 |
| Otherwise | 7 | 1 | 2 |

Referring again to FIG. 5, entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to determine a current reconstructed sample value, determine a sum value, wherein the sum value is determined as a sum of a first value determined according a filter and a second value determined according to a vertical sample position, and calculate a modified reconstructed sample value as the sum of the first value and the second value. Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. It should be noted that the term conforming bitstream may be used in place of the term compliant bitstream. It should be noted that data encapsulator 107 need not necessary be located in the same physical device as video encoder 106. For example, functions described as being performed by video encoder 106 and data encapsulator 107 may be distributed among devices illustrated in FIG. 4. Interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, $I^2C$, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, $I^2C$, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
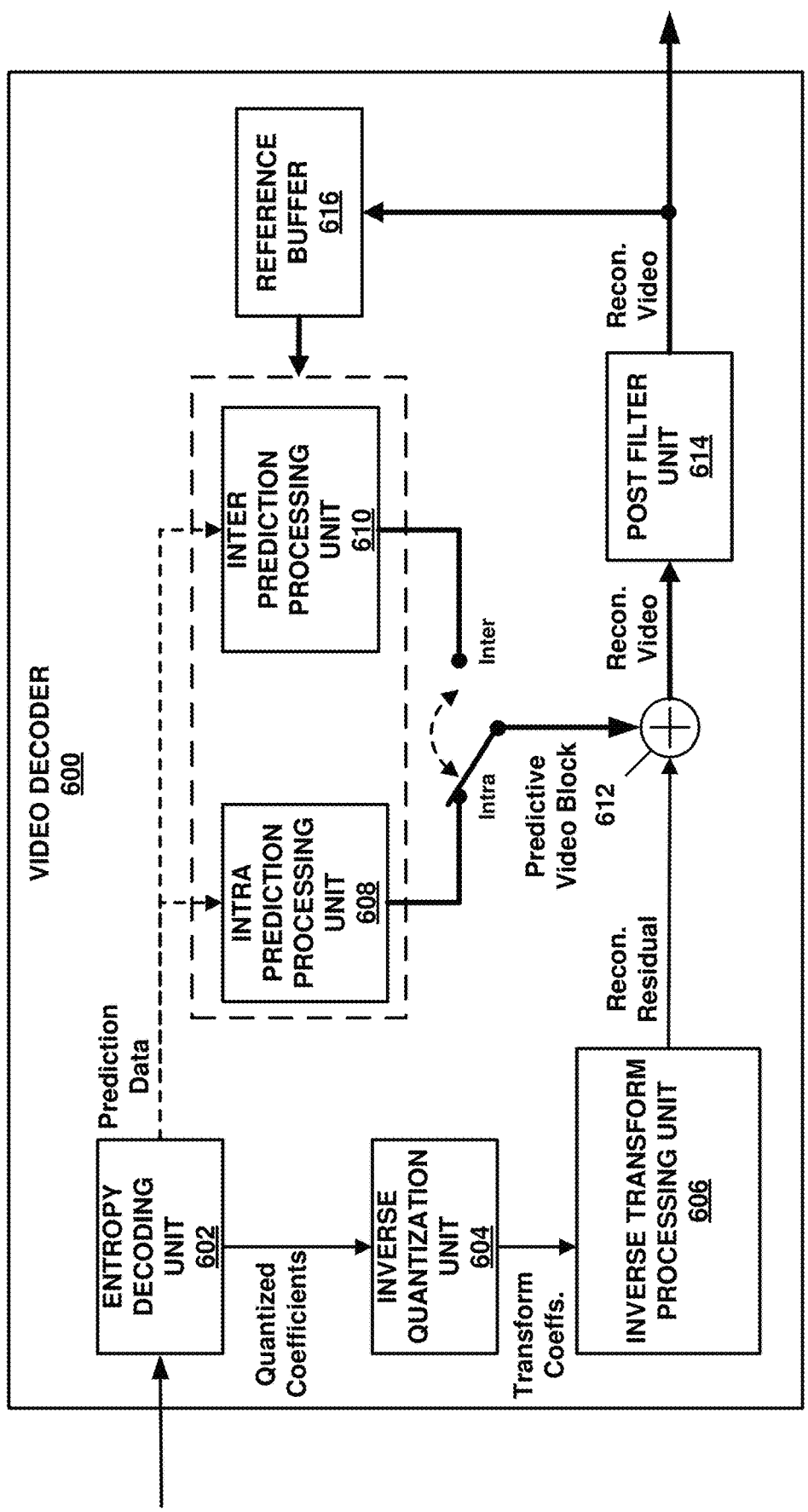
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure (e.g., the decoding process for reference-picture list construction described above). In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above. Video decoder 600 may decode a picture based on or according to the processes described above.

In the example illustrated in FIG. 6, video decoder 600 includes an entropy decoding unit 602, inverse quantization unit and transform coefficient processing unit 604, intra prediction processing unit 606, inter prediction processing unit 608, summer 610, post filter unit 612, and reference buffer 614. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and prediction data from a bitstream. In the example, illustrated in FIG. 6, inverse quantization unit and transform coefficient processing unit 604 receives a quantization parameter, quantized coefficient values, transform data, and prediction data from entropy decoding unit 602 and outputs reconstructed residual data.

Referring again to FIG. 6, reconstructed residual data may be provided to summer 610. Summer 610 may add reconstructed residual data to a predictive video block and generate reconstructed video data. A predictive video block may be determined according to a predictive video technique (i.e., intra prediction and inter frame prediction). Intra prediction processing unit 606 may be configured to receive intra prediction syntax elements and retrieve a predictive video block from reference buffer 614. Reference buffer 614 may include a memory device configured to store one or more frames of video data. Intra prediction syntax elements may identify an intra prediction mode, such as the intra prediction modes described above. Inter prediction processing unit 608 may receive inter prediction syntax elements and generate motion vectors to identify a prediction block in one or more reference frames stored in reference buffer 616. Inter prediction processing unit 608 may produce motion compensated blocks, possibly performing interpolation based on interpolation filters. Identifiers for interpolation filters to be used for motion estimation with sub-pixel precision may be included in the syntax elements. Inter prediction processing unit 608 may use interpolation filters to calculate interpolated values for sub-integer pixels of a reference block. Post filter unit 614 may be configured to perform filtering on reconstructed video data, according to one or more of the techniques described above. For example, post filter unit 614 may be configured to perform deblocking, ALF, and/or Sample Adaptive Offset (SAO) filtering based on the techniques described above and e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to determine a current reconstructed sample value, determine a sum value, wherein the sum value is determined as a sum of a first value determined according a filter and a second value determined according to a vertical sample position, and calculate a modified reconstructed sample value as the sum of the first value and the second value.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2)a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

CROSS REFERENCE

This Nonprovisional application claims priority under 35 U.S.C. § 119 on provisional Application No. 63/003,241 on Mar. 31, 2020, the entire contents of which are hereby incorporated by reference.

The invention claimed is:
1. A method of modifying a reconstructed sample value, the method comprising:
 determining a current reconstructed sample value curr;
 determining a variable alfShiftY for a shift operation according to a vertical position;

determining a sum value S;

determining a modified sum value being equivalent to a value of MS in the following equation, $MS = curr + ((S + (1 << alfShiftY >> 1)) >> alfShiftY)$; and calculating a modified reconstructed sample value by using the modified sum value.

2. The method of claim 1, wherein the modified reconstructed sample value is a luma value.

3. The method of claim 1, wherein the modified reconstructed sample value is a chroma value.

4. A device comprising one or more processors configured to:

determine a current reconstructed sample value curr;

determine a variable alfShiftY for a shift operation according to a vertical position;

determine a sum value S;

determine a modified sum value being equivalent to a value of MS in the following equation, $MS = curr + ((S + (1 << alfShiftY >> 1)) >> alfShiftY)$; and calculate a modified reconstructed sample value by using the modified sum value.

* * * * *